US012773776B2

(12) United States Patent
Kalashnikov et al.

(10) Patent No.: US 12,773,776 B2
(45) Date of Patent: Oct. 27, 2026

(54) DEEP REINFORCEMENT LEARNING FOR ROBOTIC MANIPULATION

(71) Applicant: Google LLC, Mountain View, CA (US)

(72) Inventors: Dmitry Kalashnikov, Fair Lawn, NJ (US); Alexander Irpan, Palo Alto, CA (US); Peter Pastor Sampedro, Oakland, CA (US); Julian Ibarz, Mountain View, CA (US); Alexander Herzog, San Jose, CA (US); Eric Jang, Cupertino, CA (US); Deirdre Quillen, Brookline, MA (US); Ethan Holly, San Francisco, CA (US); Sergey Levine, Berkeley, CA (US)

(73) Assignee: Google LLC, Mountain View, CA (US)

( * ) Notice: Subject to any disclaimer, the term of this patent is extended or adjusted under 35 U.S.C. 154(b) by 1725 days.

(21) Appl. No.: 17/052,679

(22) PCT Filed: Jun. 14, 2019

(86) PCT No.: PCT/US2019/037264
§ 371 (c)(1),
(2) Date: Nov. 3, 2020

(87) PCT Pub. No.: WO2019/241680
PCT Pub. Date: Dec. 19, 2019

(65) Prior Publication Data

US 2021/0237266 A1 Aug. 5, 2021

Related U.S. Application Data

(60) Provisional application No. 62/685,838, filed on Jun. 15, 2018.

(51) Int. Cl.
*G06N 3/08* (2023.01)
*B25J 9/16* (2006.01)
(Continued)

(52) U.S. Cl.
CPC ............... *B25J 9/163* (2013.01); *B25J 9/161* (2013.01); *B25J 9/1612* (2013.01); *B25J 9/1661* (2013.01);
(Continued)

(58) Field of Classification Search
CPC .......... G06N 3/08; G06N 20/00; G06N 3/002; G05B 13/02; B25J 9/163; B25J 9/161; B25J 9/1612; B25J 9/1661; B25J 9/1697
See application file for complete search history.

(56) References Cited

U.S. PATENT DOCUMENTS 5,063,492 A * 11/1991 Yoda ........................ B25J 9/161 700/61
8,958,912 B2 * 2/2015 Blumberg ............. B25J 9/1682 700/259
(Continued)

FOREIGN PATENT DOCUMENTS

CN 105637540 6/2016
CN 107272785 10/2017
(Continued)

OTHER PUBLICATIONS

Timothy P Lillicrap, et. al, Continuous control with deep reinforcement learning, Sep. 2015, arXiv: 1509.02971v1 [cs. LG] Sep. 9, 2015 . (Year: 2015).*
(Continued)

*Primary Examiner* — Li B. Zhen
*Assistant Examiner* — Tirumale K Ramesh
(74) *Attorney, Agent, or Firm* — Gray Ice Higdon

(57) ABSTRACT

Using large-scale reinforcement learning to train a policy model that can be utilized by a robot in performing a robotic task in which the robot interacts with one or more environmental objects. In various implementations, off-policy deep reinforcement learning is used to train the policy model, and
(Continued)

the off-policy deep reinforcement learning is based on self-supervised data collection. The policy model can be a neural network model. Implementations of the reinforcement learning utilized in training the neural network model utilize a continuous-action variant of Q-learning. Through techniques disclosed herein, implementations can learn policies that generalize effectively to previously unseen objects, previously unseen environments, etc.

14 Claims, 11 Drawing Sheets

(51) Int. Cl.
*G05B 13/02* (2006.01)
*G06N 3/00* (2023.01)
*G06N 20/00* (2019.01)

(52) U.S. Cl.
CPC ............ *B25J 9/1697* (2013.01); *G05B 13/02* (2013.01); *G06N 3/002* (2013.01); *G06N 3/08* (2013.01); *G06N 20/00* (2019.01)

(56) References Cited

U.S. PATENT DOCUMENTS

| | | | | |
|---|---|---|---|---|
| 10,748,061 | B2 * | 8/2020 | Jiang | B25J 9/163 |
| 10,792,810 | B1 * | 10/2020 | Beckman | B25J 9/163 |
| 11,188,821 | B1 * | 11/2021 | Kalakrishnan | G06N 3/063 |
| 2013/0345863 | A1 | 12/2013 | Linder | |
| 2015/0100530 | A1 * | 4/2015 | Mnih | G06N 3/08<br>706/25 |
| 2017/0252924 | A1 | 9/2017 | Vijayanarasimhan et al. | |
| 2018/0174038 | A1 | 6/2018 | Jiang | |
| 2019/0152054 | A1 * | 5/2019 | Ishikawa | B25J 9/163 |
| 2019/0180189 | A1 * | 6/2019 | Biesemann | G06N 3/08 |
| 2019/0250568 | A1 * | 8/2019 | Li | G06N 7/01 |
| 2020/0206918 | A1 * | 7/2020 | Sun | G06N 20/00 |
| 2021/0191404 | A1 * | 6/2021 | Blake | G05D 1/0214 |
| 2021/0205985 | A1 * | 7/2021 | Zhang | B25J 9/163 |

FOREIGN PATENT DOCUMENTS

| | | |
|---|---|---|
| CN | 107357757 | 11/2017 |
| WO | 2018053187 | 3/2018 |

OTHER PUBLICATIONS

Levine et al.; Learning Hand-Eye Cordination for Robotic Grasping with Deep Learning and Large-Scale Data Collection; International Journal of Robotics Research; vol. 37, No. 4-5; pp. 421-436; dated Jun. 12, 2017.
Quillen, D. et al. "Deep Reinforcement Learning for Vision-Based Robotic Grasping: A Simulated Comparative Evaluation of Off-Policy Methods"; Cornell University; ArXiv.org; arXiv:1802.10264v2; 8 pages; Feb. 28, 2018.
European Patent Office; International Search Report and Written Opinion of PCT Ser. No. PCT/US2019/037264; 23 pages; dated Oct. 15, 2019.
Lenz et al. "Deep learning for detecting robotic grasps", International Journal of Robotics Research., vol. 34, No. 4-5, Mar. 16, 2015 (Mar. 16, 2015), pp. 705-724.
Viereck, U. et al.; Learning a Visuomotor Controller for Real World Robotic Grasping using Simulated Depth Images; v 1st Conference on Robot Learning; 10 pages; dated 2017.
Pinto et al.; Supersizing Self-supervision_ Learning to Grasp from 50K Tries and 700 Robot Hours; 2016 IEEE International Comference on Robotics and Automation (ICRA); pp. 3406-3413; dated May 16, 2016.
Mnih et al. "Human-Level Control Through Deep Reinforcement Learning." Nature 518, No. 7540 (2015): 529-533 2015.
Fujimoto, Scott et al.; "Addressing Function Approximation Error in Actor-Critic Methods;" Cornell University, arXiv.org, arXiv:1802.09477; 15 pages; dated Oct. 22, 2018.
Coumans, E., et al.; Pybullet, aPython Module for Physics Simulation, Games, Robotics and Machine Learning; http://pybullet.org/; dated 2016.
Ioffe et al. "Batch Normalization: Accelerating Deep Network Training by Reducing Internal Covariate Shift;" In Proceedings of The 32nd International Conference on Machine Learning; 11 pages; 2015.
Abadi et al., "Tensorflow: Large-scale Machine Learning on Heterogeneous Systems;" Software from tensorflow.org; 19 pages; Nov. 9, 2015.
Bohg et al. "Data-Driven Grasp Synthesis—A Survey." IEEE Transactions on Robotics, vol. 30, Issue 2; 21 pages; Apr. 2014.
Lillicrap, T. et al., "Continuous Control With Deep Reinforcement Learning;" Cornell University, arXiv.org, arXiv: 1509.02971v2; 14 pages; Nov. 18, 2015.
Duan, Y. et al., "Benchmarking Deep Reinforcement Learning For Continuous Control;" Proceedings of the 33rd International Conference on Machine Learning, vol. 48, ICML, 10 pages; 2016.
Weisz et al. "Pose Error Robust Grasping from Contact Wrench Space Metrics." In Robotics and Automation (ICRA), 2012 IEEE International Conference on, pp. 557-562.
Rubinstein et al. "The Cross-Entropy Method: A Unified Approach to Combinatorial Optimization, Monte-Carlo Simulation and Machine Learning." Springer-Verlag (2004). 316 pages.
Sutton, R. S., et al.; Reinforcement Learning: An Introduction; MIT Press; 10 Pages; US; dated 1998.
Peters, J. et al., "Reinforcement Learning of Motor Skills With Policy Gradients;" Neural Networks, 21; Robotics and Neuroscience; pp. 682-697; 2008.
Kalakrishnan, M. et al., "Learning Force Control Policies for Compliant Manipulation;" IEEE/RSJ International Conference on Intelligent Robots and Systems; 6 pages; Sep. 25, 2011.
Yahya, A. et al., "Collective Robot Reinforce¬ment Learning With Distributed Asynchronous Guided Policy Search;" IEEE/RSJ International Conference on Intelligent Robots and Systems; 8 pages; 2017.
Ghadirzadeh, A. et al., "Deep Predictive Policy Training US¬ing Reinforcement Learning;" IEEE/RSJ International Conference on Intelligent Robots and Systems; 8 pages; 2017.
Zeng, A. et al., "Learning Synergies between Pushing and Grasping with Self-supervised Deep Reinforcement Learning;" Cornell University, arXiv.org, arXiv:1803.09956; 9 pages; 2018.
Morrison, D. et al., "Cartman: The Low-Cost Cartesian Manipulator That Won The Amazon Robotics Challenge;" IEEE International Conference on Robotics and Automation; 8 pages; 2018.
Mahler, J. et al., "Dex-Net 3.0: Computing Robust Robot Suction Grasp Targets in Point Clouds using a New Analytic Model and Deep Learning;" Cornell University, arXiv.org, arXiv:1709.06670v1; 15 pages; Sep. 19, 2017.
Ten Pas, A. et al., "Grasp Pose Detection in Point Clouds;" The International Journal of Robotics Research, vol. 36, Issue 13-14; 17 pages; 2017.
Chavan-Dafle, N. et al., "Stable Prehensile Pushing: In-Hand Manipulation with Alternating Sticking Contacts;" IEEE International Conference on Robotics and Automation (ICRA); 8 pages; 2018.
Tesauro, G.; "TD-Gammon, a Self-Teaching Backgammon Program, Achieves Master-Level Play;" Neural Computation; MIT; 5 pages; Mar. 1994.
Machado, M. et al., "Revisiting the Arcade Learning Environment: Evaluation Protocols and Open Problems for General Agents;" Cornell University, arXiv.org, arXiv: 1709.06009v2; 39 pages; 2017.
Hafner, R. et al., "Reinforcement Learning in Feedback Control;" Machine Learning, 84(1-2); 33 pages; 2011.
Henderson, P. et al., "Deep Reinforcement Learning that Matters;" Cornell University, arXiv.org, arXiv:1709.06560v2; 26 pages; Nov. 24, 2017.

(56) References Cited

OTHER PUBLICATIONS

Kahn, G. et al., "Self-Supervised Deep Reinforcement Learning with Generalized Computation Graphs for Robot Navigation;" IEEE International Conference on Robotics and Automation; 11 pages; 2018.
Levine, S. et al. "End-to-End Training of Deep Visuomotor Policies;" Journal of Machine Learning Research, 17; 40 pages; Apr. 2016.
Yu, K. et al.; "Realtime State Estimation with Tactile and Visual Sensing. Application to Planar Manipulation;" In IEEE International Conference on Robotics and Automation; 8 pages; 2018.
Hausman, K. et al. "Regrasping Using Tactile Perception and Supervised Policy Learning;" In AAAI Symposium on Interactive Multi-Sensory Object Perception for Embodied Agents; 4 pages; 2017.
Morrison, D. et al. "Closing the Loop for Robotic Grasping: A Real-time, Generative Grasp Synthesis Approach;" In Robotics: Science and Systems; 10 pages, 2018.
Gu, S. et al., "Continuous Deep Q-learning with Model-Based Acceleration;" In Proceedings of International Conference on Machine Learning; 10 pages; 2016.
Polyak, B et al., "Acceleration of Stochastic Approximation By Averaging;" SIAM Journal on Control and Optimization, vol. 30, No. 4, pp. 838-855; Jul. 1992.
Van Hasselt, H. "Double Q-learning;" Advances in Neural Information Processing Systems; 9 pages; 2010.
Van Hasselt, H. et al., "Deep Reinforcement Learning with Double Q-Learning;" In AAAI Conference on Artificial Intelligence; 7 pages; 2016.
Amos, B. et al. "Input Convex Neural Networks;" In International Conference on Machine Learning, vol. 70; 10 pages; 2017.
Chang, A. et al., "ShapeNet: An Information-Rich 3D Model Repository;" Cornell University, arXiv.org, arXiv:1512.03012v1; 11 pages; Dec. 9, 2015.
Stooke, A. et al., "Accelerated Methods for Deep Reinforcement Learning;" Cornell University, arXiv.org, arXiv:1803.02811v1; 17 pages; Mar. 7, 2018.
Espeholt, L. et al., "IMPALA: Scalable Distributed Deep-RL With Importance Weighted Actor-Learner Architectures;" Cornell University, arXiv.org, arXiv: 1802.01561v3; 22 pages; Jun. 28, 2018.
Nair, A. et al., "Massively Parallel Methods For Deep Reinforcement Learning;" Cornell University, arXiv.org, arXiv:1507.04296v2; 14 pages; Jul. 16, 2015.
Horgan, D. et al., "Distributed Prioritized Experience Replay;" In International Conference on Learning Representations; 19 pages; 2018.
Dean, J. et al., "Large Scale Distributed Deep Networks;" In Advances in Neural Information Processing Systems; 9 pages; 2012.
Brockman, G. et al., "OpenAI Gym;" Cornell University, arXiv.org, arXiv:1606.01540v1; 4 pages; Jun. 5, 2016.
European Patent Office; Communication pursuant to Article 94(3) EPC issued in Application No. 19736873.1; 5 pages; dated Dec. 21, 2022.
China National Intellectual Property Administration; Notice of First Office Action issued for Application No. 201980040252.8, 11 pages, dated Feb. 7, 2024.
China National Intellectual Property Administration; Grant Notice issued for Application No. 201980040252.8, 8 pages, dated Aug. 22, 2024.
European Patent Office; Communication pursuant to Article 94(3) EPC issued in Application No. 1973687.1, 5 pages; dated Apr. 25, 2025.

* cited by examiner

DEEP REINFORCEMENT LEARNING FOR ROBOTIC MANIPULATION

BACKGROUND

Many robots are explicitly programmed to utilize one or more end effectors to manipulate one or more environmental objects. For example, a robot may utilize a grasping end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

SUMMARY

Some implementations disclosed herein are related to using large-scale reinforcement learning to train a policy model that can be utilized by a robot in performing a robotic task in which the robot interacts with one or more environmental objects. One non-limiting example of such a robotic task is robotic grasping, which is described in various examples presented herein. However, implementations disclosed herein can be utilized to train a policy model for other non-grasping robotic tasks such as opening a door, throwing a ball, pushing objects, etc.

In implementations disclosed herein, off-policy deep reinforcement learning is used to train the policy model, and the off-policy deep reinforcement learning is based on self-supervised data collection (e.g., using only self-supervised data). On-policy deep reinforcement learning can also be used to train the policy model, and can optionally be interspersed with the off-policy deep reinforcement learning as described herein. The self-supervised data utilized in the off-policy deep reinforcement learning can be based on sensor observations from real-world robots in performance of episodes of the robotic task, and can optionally be supplemented with self-supervised data from robotic simulations of performance of episodes of the robotic task. Through off-policy training, large-scale autonomous data collection, and/or other techniques disclosed herein, implementations can learn policies that generalize effectively to previously unseen objects, previously unseen environments, etc.

The policy model can be a machine learning model, such as a neural network model. Moreover, as described herein, implementations of the reinforcement learning utilized in training the neural network model utilize a continuous-action variant of Q-learning. Accordingly, the policy model can represent the Q-function. Implementations disclosed herein train and utilize the policy model for performance of closed-loop vision-based control, where a robot continuously updates its task strategy based on the most recent vision data observations to optimize long-horizon task success. In some of those implementations, the policy model is trained to predict the value of an action in view of current sate data. For example, the action and the state data can both be processed using the policy model to generate a value that is a prediction of the value in view of the current state data.

As mentioned above, the current state data can include vision data captured by a vision component of the robot (e.g., a 2D image from a monographic camera, a 2.5D image from a stereographic camera, and/or a 3D point cloud from a 3D laser scanner). The current state data can include only the vision data, or can optionally include additional data such as whether a grasping end effector of the robot is open or closed. The action can include a pose change for a component of the robot, such as pose change, in Cartesian space, for a grasping end effector of the robot. The pose change can be defined by the action as, for example, a translation difference (indicating a desired change in position) and a rotation difference (indicating a desired change in azimuthal angle). The action can further include, for example, a component action command that dictates a target state of a dynamic state of the component, where the dynamic state is in addition to translation and rotation of the object. For instance, the component action command can indicate whether a gripper is to be opened, closed, or adjusted to a target state between opened and closed (e.g., partially closed). The action can further include a termination command that dictates whether to terminate performance of the robotic task.

As described herein, the policy model is trained in view of a reward function that can assign a positive reward (e.g., "1") or a negative reward (e.g., "0") at the last time step of an episode of performing a task. The last time step is one where a termination action occurred, as a result of an action determined based on the policy model indicating termination, or based on a maximum number of time steps occurring. Various self-supervision techniques can be utilized to assign the reward. For example, for a grasping task, at the end of an episode the gripper can be moved out of the view of the camera and a first image captured when it is out of the view. Then the gripper can be returned to its prior position and "opened" (if closed at the end of the episode) to thereby drop any grasped object, and a second image captured. The first image and the second image can be compared, using background subtraction and/or other techniques, to determine whether the gripper was grasping an object (e.g., the object would be present in the second image, but not the first)—and an appropriate award assigned to the last time step. In some implementations, the reward function can assign a small penalty (e.g., −0.05) for all time steps where the termination action is not taken. The small penalty can encourage the robot to perform the task quickly.

To enable the policy model to learn generalizable strategies, it is trained on a diverse set of data representing various objects and/or environments. For example, a diverse set of objects can be needed to enable the policy model to learn generalizable strategies for grasping, such as picking up new objects, performing pre-grasp manipulation, and/or handling dynamic disturbances with vision-based feedback. Collecting such data in a single on-policy training run can be impractical. For example, collecting such data in a single on-policy training run can require significant "clock on the wall" training time and resulting occupation of real-world robots.

Accordingly, implementations disclosed herein utilize a continuous-action generalization of Q-learning, which is sometimes reference herein as "QT-Opt". Unlike other continuous action Q-learning methods, which are often unstable, QT-Opt dispenses with the need to train an explicit actor, and instead uses stochastic optimization to select actions (during inference) and target Q-values (during training). QT-opt can be performed off-policy, which makes it possible to pool experience from multiple robots and multiple experiments. For example, the data used to train the policy model can be collected over multiple robots operating over long durations. Even fully off-policy training can provide improved performance for task performance, while a moderate amount of on-policy fine-tuning using QT-opt can further improve performance. QT-opt maintains the generality of non-convex Q-functions, while avoiding the need for a second maximizer network.

In various implementations, during inference, stochastic optimization is utilized to stochastically select actions to evaluate in view of a current state and using the policy model—and to stochastically select a given action (from the evaluated actions) to implement in view of the current state. For example, the stochastic optimization can be a derivative-free optimization algorithm, such as the cross-entropy method (CEM). CEM samples a batch of N values at each iteration, fits a Gaussian distribution to the best M<N of these samples, and then samples next batch of N from that Gaussian. As one non-limiting example, N can be 64 and M can be 6. During inference, CEM can be used to select 64 candidate actions, those actions evaluated in view of a current state and using the policy model, and the 6 best can be selected (e.g., the 6 with the highest Q-values generated using the policy model). A Gaussian distribution can be fit to those 6, and 64 more actions selected from that Gaussian. Those 64 actions can be evaluated in view of the current state and using the policy model, and the best one (e.g., the one with the highest Q-value generated using the policy model) can be selected as the action to be implemented. The preceding example is a two iteration approach with N=64 and M=6. Additional iterations can be utilized, and/or alternative N and/or M values.

In various implementations, during training, stochastic optimization is utilized to determine a target Q-value for use in generating a loss for a state, action pair to be evaluated during training. For example, stochastic optimization can be utilized to stochastically select actions to evaluate in view of a "next state" that corresponds to the state, action pair and using the policy model- and to stochastically select a Q-value that corresponds to given action (from the evaluated actions). The target Q-value can be determined based on the selected Q-value. For example, the target Q-value can be a function of the selected Q-value and the reward (if any) for the state, action pair being evaluated.

The above description is provided as an overview of only some implementations disclosed herein. These and other implementations are described in more detail herein.

In some implementations, a method implemented by one or more processors of a robot during performance of a robotic task is provided and includes: receiving current state data for the robot and selecting a robotic action to be performed for the robotic task. The current state data includes current vision data captured by a vision component of the robot. Selecting the robotic action includes: performing an optimization over candidate robotic actions using, as an objective function, a trained neural network model that represents a Q-function, and that is trained using reinforcement learning, where performing the optimization includes generating Q-values for a subset of the candidate robotic actions that are considered in the optimization. Generating each of the Q-values is based on processing of the state data and a corresponding one of the candidate robotic actions of the subset using the trained neural network model. Selecting the robotic action further includes selecting the robotic action, from the candidate robotic actions, based on the Q-values generated for the robotic action during the performed optimization. The method further includes providing commands to one or more actuators of the robot to cause performance of the selected robotic action.

These and other implementations may include one or more of the following features.

In some implementations, the robotic action includes a pose change for a component of the robot, where the pose change defines a difference between a current pose of the component and a desired pose for the component of the robot. In some of those implementations, the component is an end effector and the pose change defines a translation difference for the end effector and a rotation difference for the end effector. In some versions of those implementations, the end effector is a gripper and the robotic task is a grasping task.

In some implementations, the robotic action includes a termination command that dictates whether to terminate performance of the robotic task. In some of those implementations, the robotic action further includes a component action command that dictates a target state of a dynamic state of the component, where the dynamic state is in addition to translation and rotation of the component. In some versions of those implementations, the component is a gripper and the target state dictated by the component action command indicates that the gripper is to be closed. In some versions of those implementations, the component action command includes an open command and a closed command that collectively define the target state as opened, closed, or between opened and closed.

In some implementations, the current state data further includes a current status of a component of the robot. In some of those implementations, the component of the robot is a gripper and the current status indicates whether the gripper is opened or closed.

In some implementations, the optimization is a stochastic optimization. In some of those implementations, the optimization is a derivative-free method, such as a cross-entropy method (CEM).

In some implementations, performing the optimization over the candidate robotic actions includes: selecting an initial batch of the candidate robotic actions; generating a corresponding one of the Q-values for each of the candidate robotic actions in the initial batch; selecting an initial subset of the candidate robotic actions in the initial batch based on the Q-values for the candidate robotic actions in the initial batch; fitting a Gaussian distribution to the selected initial subset of the candidate robotic actions; selecting a next batch of the candidate robotic actions based from the Gaussian distribution; and generating a corresponding one of the Q-values for each of the candidate robotic actions in the next batch. In some of those implementations, the robotic action is one of the candidate robotic actions in the next batch, and selecting the robotic action, from the candidate robotic actions, based on the Q-value generated for the robotic action during the performed optimization includes: selecting the robotic action from the next batch based on the Q-value generated for the robotic action being the maximum Q-value of the corresponding Q-values of the next batch.

In some implementations, generating each of the Q-values based on processing of the state data and a corresponding one of the candidate robotic actions of the subset using the trained neural network model includes: processing the state data using a first branch of the trained neural network model to generate a state embedding; processing a first of the candidate robotic actions of the subset using a second branch of the trained neural network model to generate a first embedding; generating a combined embedding by tiling the state embedding and the first embedding; and processing the combined embedding using additional layers of the trained neural network model to generate a first Q-value of the Q-values. In some of those implementations, generating each of the Q-values based on processing of the state data and a corresponding one of the candidate robotic actions of the subset using the trained neural network model further includes: processing a second of the candidate robotic actions of the subset using the second branch of the trained neural network model to generate a second embedding; generating an additional combined embedding by reusing the state embedding, and tiling the reused state embedding and the first embedding; and processing the additional combined embedding using additional layers of the trained neural network model to generate a second Q-value of the Q-values.

In some implementations, a method of training a neural network model that represents a Q-function is provided. The method implemented by a plurality of processors, and the method includes: retrieving a robotic transition, the robotic transition generated based on data from an episode of a robot performing a robotic task. The robotic transition includes: state data that includes vision data captured by a vision component at a state of the robot during the episode; next state data that includes next vision data captured by the vision component at a next state of the robot during the episode, the next state being transitioned to from the state; an action executed to transition from the state to the next state; and a reward for the robotic transition. The method further includes determining a target Q-value for the robotic transition. Determining the target Q-value includes: performing an optimization over candidate robotic actions using, as an objective function, a version of a neural network model that represents the Q-function. Performing the optimization includes generating Q-values for a subset of the candidate robotic actions that are considered in the optimization, where generating each of the Q-values is based on processing of the next state data and a corresponding one of the candidate robotic actions of the subset using the version of the neural network model. Determining the target Q-value further includes: selecting, from the generated Q-values, a maximum Q-value; and determining the target Q-value based on the maximum Q-value and the reward. The method further includes: storing, in a training buffer: the state data, the action, and the target Q-value; retrieving, from the training buffer: the state data, the action, and the target Q-value; and generating a predicted Q-value. Generating the predicted Q-value includes processing the retrieved state data and the retrieved action using a current version of the neural network model, where the current version of the neural network model is updated relative to the version. The method further includes generating a loss based on the predicted Q-value and the target Q-value and updating the current version of the neural network model based on the loss.

These and other implementations of the technology can include one or more of the following features.

In some implementations, the robotic transition is generated based on offline data and is retrieved from an offline buffer. In some of those implementations, retrieving the robotic transition from the offline buffer is based on a dynamic offline sampling rate for sampling from the offline buffer, where the dynamic offline sampling rate decreases as a duration of training the neural network model increases. In some versions of those implementations, the method further includes generating the robotic transition by accessing an offline database that stores offline episodes.

In some implementations, the robotic transition is generated based on online data and is retrieved from an online buffer, where the online data is generated by a robot performing episodes of the robotic task using a robot version of the neural network model. In some of those implementations, retrieving the robotic transition from the online buffer is based on a dynamic online sampling rate for sampling from the online buffer, where the dynamic online sampling rate increases as a duration of training the neural network model increases. In some versions of those implementations, the method further includes updating the robot version of the neural network model based on the loss.

In some implementations, the action includes a pose change for a component of the robot, where the pose change defines a difference between a pose of the component at the state and a next pose of the component at the next state.

In some implementations, the action includes a termination command when the next state is a terminal state of the episode.

In some implementations, the action includes a component action command that defines a dynamic state, of the component, in the next state of the episode the dynamic state being in addition to translation and rotation of the component.

In some implementations, performing the optimization over the candidate robotic actions includes: selecting an initial batch of the candidate robotic actions; generating a corresponding one of the Q-values for each of the candidate robotic actions in the initial batch; selecting an initial subset of the candidate robotic actions in the initial batch based on the Q-values for the candidate robotic actions in the initial batch; fitting a Gaussian distribution to the selected initial subset of the candidate robotic actions; selecting a next batch of the candidate robotic actions based on the Gaussian distribution; and generating a corresponding one of the Q-values for each of the candidate robotic actions in the next batch. In some of those implementations, the maximum Q-value is one of the Q-values of the candidate robotic actions in the next batch and selecting the maximum Q-value is based on the maximum Q-value being the maximum Q-value of the corresponding Q-values of the next batch.

In some implementations, a method implemented by one or more processors of a robot during performance of a robotic task is provided and includes: receiving current state data for the robot, the current state data including current sensor data of the robot; and selecting a robotic action to be performed for the robotic task. Selecting the robotic action includes: performing an optimization over candidate robotic actions using, as an objective function, a trained neural network model that represents a learned optimal policy, where performing the optimization includes generating values for a subset of the candidate robotic actions that are considered in the optimization, and where generating each of the values is based on processing of the state data and a corresponding one of the candidate robotic actions of the subset using the trained neural network model. Selecting the robotic action further includes selecting the robotic action, from the candidate robotic actions, based on the value generated for the robotic action during the performed optimization. The method further includes providing commands to one or more actuators of the robot to cause performance of the selected robotic action.

In some implementations, a method of training a neural network model that represents a policy is provided. The method is implemented by a plurality of processors, and the method includes: retrieving a robotic transition, the robotic transition generated based on data from an episode of a robot performing a robotic task, and the robotic transition including state data and an action. The method further includes determining a target value for the robotic transition. Determining the target value includes performing an optimization over candidate robotic actions using, as an objective function, a version of a neural network model that represents the policy. The method further includes: storing, in a training buffer: the state data, the action, and the target value; retrieving, from the training buffer: the state data, the action data, and the target value; and generating a predicted value. Generating the predicted value includes processing the retrieved state data and the retrieved action data using a current version of the neural network model, where the current version of the neural network model is updated relative to the version. The method further includes generating a loss based on the predicted value and the target value and updating the current version of the neural network model based on the loss.

Other implementations may include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
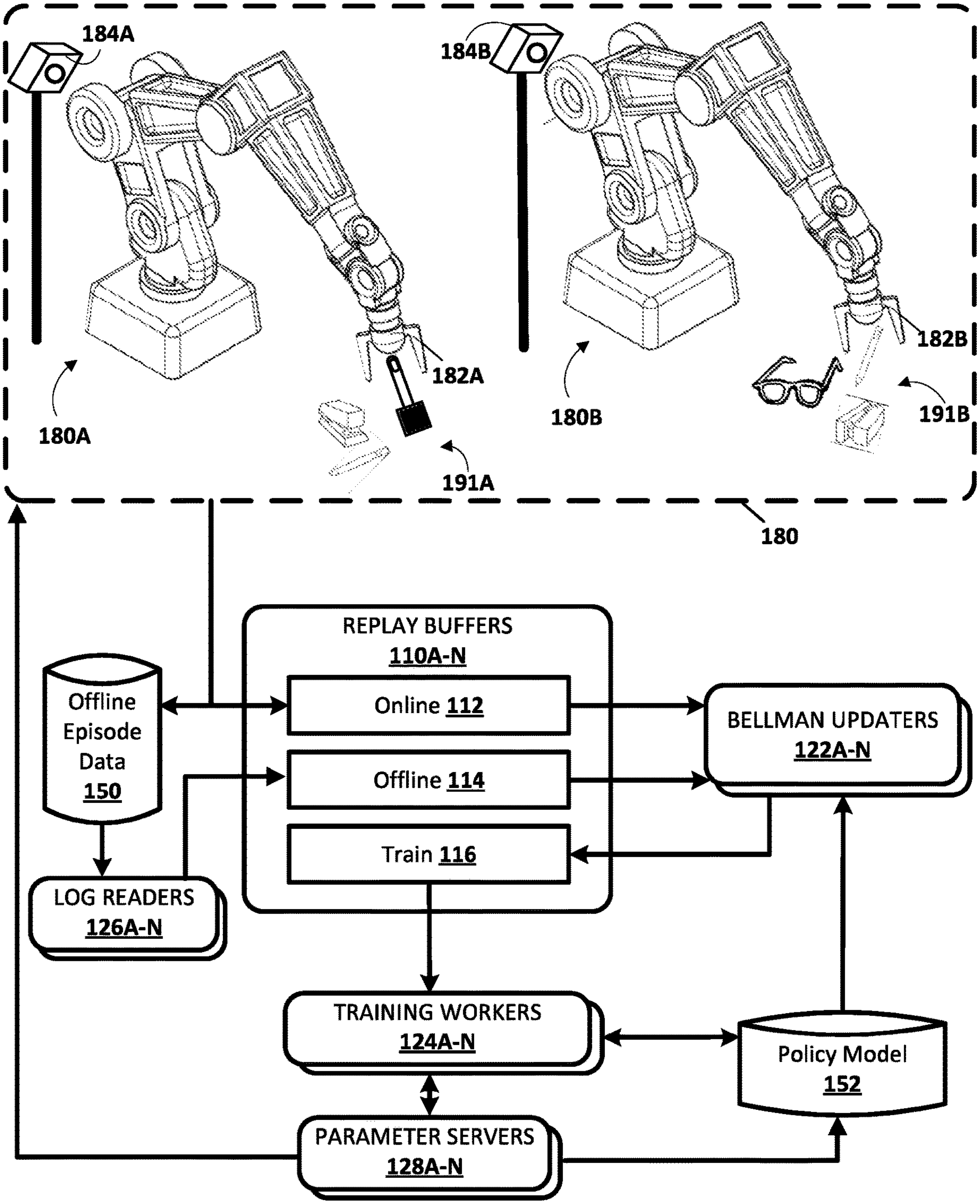
FIG. 1 illustrates an example environment in which implementations disclosed herein can be implemented.

FIG. 1 illustrates robots 180, which include robots 180A, 180B, and optionally other (unillustrated) robots. Robots 180A and 180B are "robot arms" having multiple degrees of freedom to enable traversal of grasping end effectors 182A and 182B along any of a plurality of potential paths to position the grasping end effectors 182A and 182B in desired locations. Robots 180A and 180B each further controls the two opposed "claws" of their corresponding grasping end effector 182A, 182B to actuate the claws between at least an open position and a closed position (and/or optionally a plurality of "partially closed" positions).

Example vision components 184A and 184B are also illustrated in FIG. 1. In FIG. 1, vision component 184A is mounted at a fixed pose relative to the base or other stationary reference point of robot 180A. Vision component 184B is also mounted at a fixed pose relative to the base or other stationary reference point of robot 180B. Vision components 184A and 184B each include one or more sensors and can generate vision data related to shape, color, depth, and/or other features of object(s) that are in the line of sight of the sensors. The vision components 184A and 184B may be, for example, monographic cameras, stereographic cameras, and/or 3D laser scanners. A 3D laser scanner includes one or more lasers that emit light and one or more sensors that collect data related to reflections of the emitted light. A 3D laser scanner may be, for example, a time-of-flight 3D laser scanner or a triangulation based 3D laser scanner and may include a position sensitive detector (PSD) or other optical position sensor.

The vision component 184A has a field of view of at least a portion of the workspace of the robot 180A, such as the portion of the workspace that includes example objects 191A. Although resting surface(s) for objects 191 are not illustrated in FIG. 1, those objects may rest on a table, a tray, and/or other surface(s). Objects 191 include a spatula, a stapler, and a pencil. In other implementations more objects, fewer objects, additional objects, and/or alternative objects may be provided during all or portions of grasp episodes (or other task episodes) of robot 180A as described herein. Moreover, in many implementations objects 191A can be replaced (e.g., by a human or by another robot) with a different set of objects periodically to provide diverse training data.

The vision component 184B has a field of view of at least a portion of the workspace of the robot 180B, such as the portion of the workspace that includes example objects 191B. Although resting surface(s) for objects 191B are not illustrated in FIG. 1, they may rest on a table, a tray, and/or other surface(s). Objects 191B include a pencil, a stapler, and glasses. In other implementations more objects, fewer objects, additional objects, and/or alternative objects may be provided during all or portions of grasp episodes (or other task episodes) of robot 180B as described herein. Moreover, in many implementations objects 191B can be replaced (e.g., by a human or by another robot) with a different set of objects periodically to provide diverse training data.

Although particular robots 180A and 180B are illustrated in FIG. 1, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although particular mountings of vision sensors 184A and 184B are illustrated in FIG. 1, additional and/or alternative mountings may be utilized. For example, in some implementations, vision sensors may be mounted directly to robots, such as on non-actuable components of the robots or on actuable components of the robots (e.g., on the end effector or on a component close to the end effector). Also, for example, in some implementations, a vision sensor may be mounted on a non-stationary structure that is separate from its associated robot and/or may be mounted in a non-stationary manner on a structure that is separate from its associated robot.

Robots 180A, 180B, and/or other robots may be utilized to perform a large quantity of grasp episodes and data associated with the grasp episodes can be stored in offline episode data database 150 and/or provided for inclusion in online buffer 112 (of a corresponding one of replay buffers 110A-N), as described herein. As described herein, robots 180A and 180B can optionally initially perform grasp episodes (or other task episodes) according to a scripted exploration policy, in order to bootstrap data collection. The scripted exploration policy can be randomized, but biased toward reasonable grasps. Data from such scripted episodes can be stored in offline episode data database 150 and utilized in initial training of policy model 152 to bootstrap the initial training.

Robots 180A and 180B can additionally or alternatively perform grasp episodes (or other task episodes) using the policy model 152, and data from such episodes provided for inclusion in online buffer 112 during training and/or provided in offline episode data database 150 (and pulled during training for use in populating offline buffer 114). For example, the robots 180A and 180B can utilize method 400 of FIG. 4 in performing such episodes. The episodes provided for inclusion in online buffer 112 during training will be online episodes. However, the version of the policy model 152 utilized in generating a given episode will still be somewhat lagged relative to the version of the policy model 152 that is trained based on instances from that episode. The episodes stored for inclusion in offline episode data database 150 will be an offline episode and instances from that episode will be later pulled and utilized to generate transitions that are stored in offline buffer 114 during training.

The data generated by a robot 180A or 180B during an episode can include state data, actions, and rewards. Each instance of state data for an episode includes at least vision-based data for an instance of the episode. For example, an instance of state data can include a 2D image when a vision component of a robot is a monographic camera. Each instance of state data can include only corresponding vision data, or can optionally include additional data such as whether a grasping end effector of the robot is open or closed at the instance. More formally, a given state observation can be represented as $s \in S$.

Each of the actions for an episode defines an action that is implemented in the current state to transition to a next state (if any next state). An action can include a pose change for a component of the robot, such as pose change, in Cartesian space, for a grasping end effector of the robot. The pose change can be defined by the action as, for example, a translation difference (indicating a desired change in position) and a rotation difference (indicating a desired change in azimuthal angle). The action can further include, for example, a component action command that dictates a target state of a dynamic state of the component, where the dynamic state is in addition to translation and rotation of the object. For instance, the component action command can indicate whether a gripper is to be opened, closed, or adjusted to a target state between opened and closed (e.g., partially closed). The action can further include a termination command that dictates whether to terminate performance of the robotic task. The terminal state of an episode will include a positive termination command to dictate termination of performance of the robotic task.

More formally, a given state observation can be represented as $a \in A$. In some implementations, for a grasping task, A includes a vector in Cartesian space $t\ E \in R^3$ indicating the desired change in the gripper position, a change in azimuthal angle encoded via a sine-cosine encoding $r \in R^3$, binary gripper open and close commands gopen and gclose and a termination command e that ends the episode, such that a=(t, r, gopen and gclose, e).

Each of the rewards can be assigned in view of a reward function that can assign a positive reward (e.g., "1") or a negative reward (e.g., "0") at the last time step of an episode of performing a task. The last time step is one where a termination action occurred, as a result of an action determined based on the policy model indicating termination, or based on a maximum number of time steps occurring. Various self-supervision techniques can be utilized to assign the reward. For example, for a grasping task, at the end of an episode the gripper can be moved out of the view of the camera and a first image captured when it is out of the view. Then the gripper can be returned to its prior position and "opened" (if closed at the end of the episode) to thereby drop any grasped object, and a second image captured. The first image and the second image can be compared, using background subtraction and/or other techniques, to determine whether the gripper was grasping an object (e.g., the object would be present in the second image, but not the first)—and an appropriate award assigned to the last time step. In some implementations, the reward function can assign a small penalty (e.g., −0.05) for all time steps where the termination action is not taken. The small penalty can encourage the robot to perform the task quickly.

Also illustrated in FIG. 1 is the offline episode data database 150, log readers 126A-N, the replay buffers 110A-N, bellman updaters 122A-N, training workers 124A-N, parameters servers 124A-N, and a policy model 152. It is noted that all components of FIG. 1 are utilized in training the policy model 152. However, once the training model is trained (e.g., considered optimized according to one or more criteria), the robots 180A and/or 180B can perform a robotic task using the policy model 152 and without other components of FIG. 1 being present.

Figure 8A:
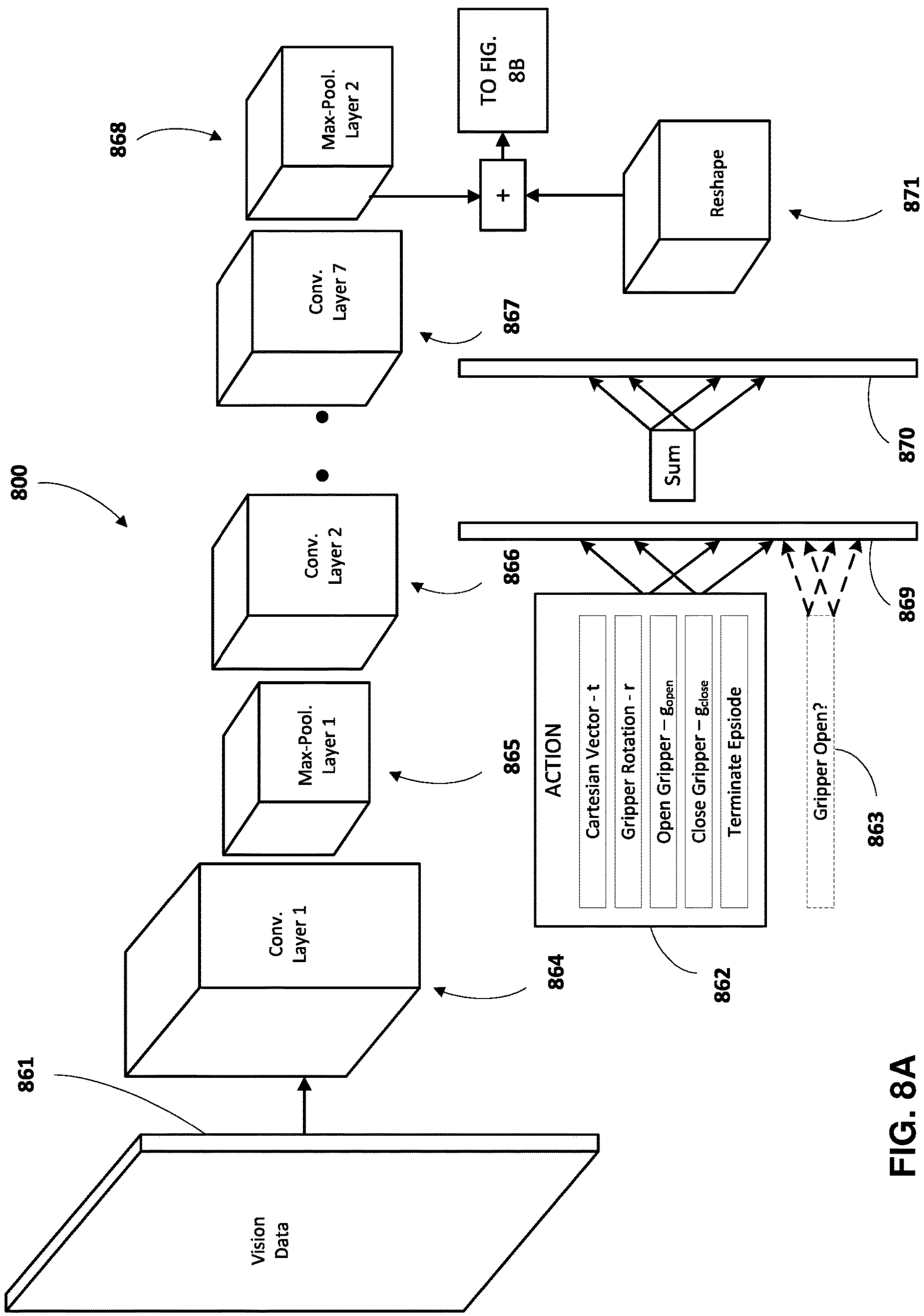
FIGS. 8A and 8B illustrate an architecture of an example policy model, example state data and action data that can be applied as input to the policy model, and an example output that can be generated based on processing the input using the policy model.
Figure 8B:
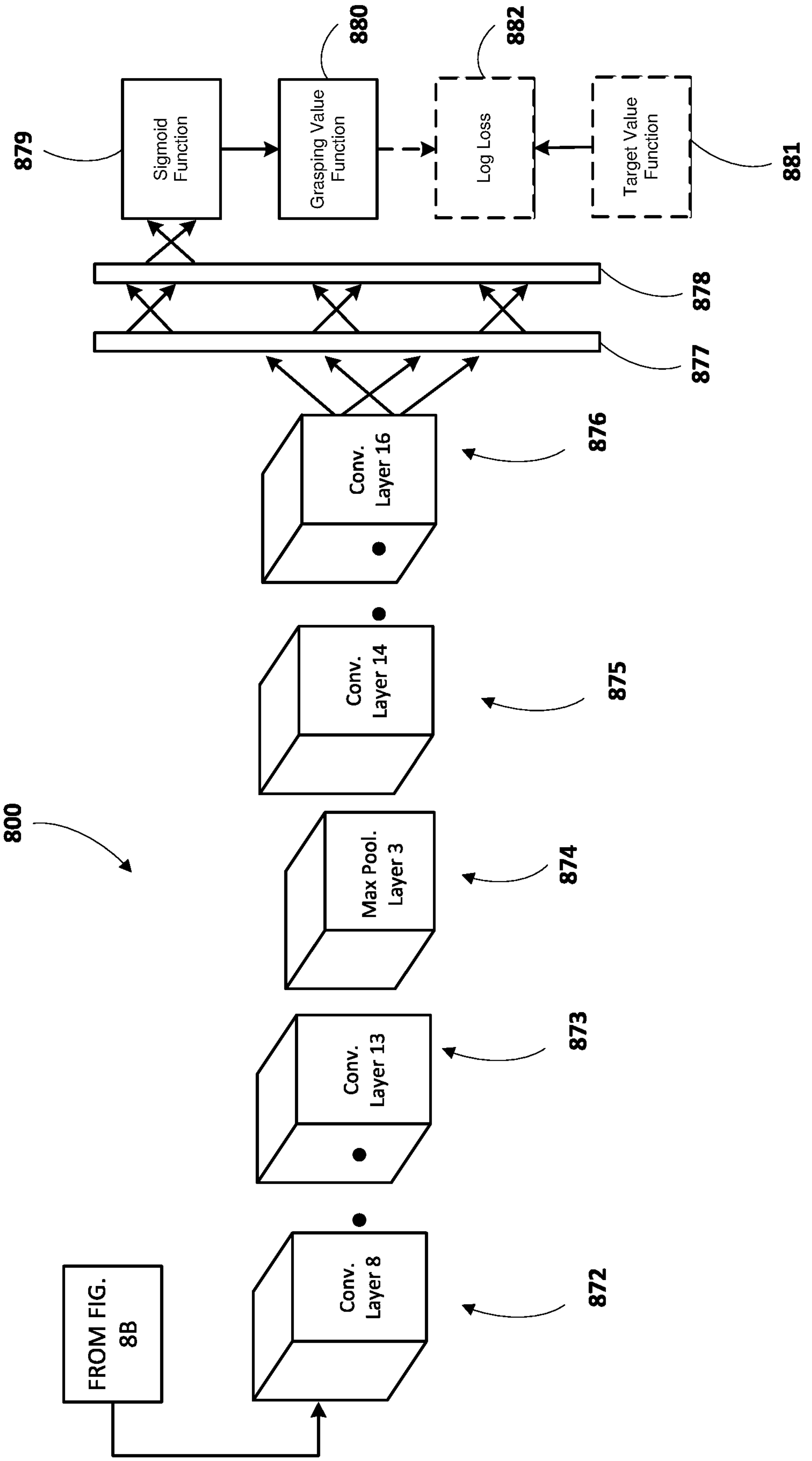

As mentioned herein, the policy model 152 can be a deep neural network model, such as the deep neural network model illustrated and described in FIGS. 8A and 8B. The policy model 152 represents a Q-function that can be represented as $Q_\theta(s, a)$, where $\theta$ denotes the learned weights in the neural network model. The reinforcement learning described herein seeks the optimal Q-function ($Q_\theta(s, a)$) by minimizing the Bellman error, given by:

$$\varepsilon(\theta) = E_{(s,a,s')\sim p(s,a,s')}[D(Q_\theta(s, a), Q_T(s, a, s'))] \quad (1)$$

where $Q_T(s, a, s')=r(s, a)+\gamma V(s')$ is a target value, and D is some divergence metric.

This corresponds to double Q-learning with a target network, a variant on the standard Bellman error, where $Q_{\bar{\theta}}$ is a lagged target network. The expectation is taken under some data distribution, which in practice is simply the distribution over all previously observed transitions. Once the Q-function is learned, the policy can be recovered according to $\pi(s)=\arg\max_a Q(s, a)$.

Q-learning with deep neural network function approximators provides a simple and practical scheme for reinforcement learning with image observations, and is amenable to straightforward parallelization. However, incorporating continuous actions, such as continuous gripper motion in grasping tasks, poses a challenge for this approach. Some prior techniques have sought to address this by using a second network that acts as an approximate maximizer or constraints the Q-function to be convex in a making it easy to maximize analytically. However, such prior techniques can be unstable, which makes it problematic for large-scale reinforcement learning tasks where running hyperparameter sweeps is prohibitively expensive. Accordingly, such prior techniques can be a poor fit for complex manipulation tasks such as grasping, where the Q-function is far from convex in the input. For example, the Q-value may be high for actions that reach toward objects, but low for the gaps between objects.

Accordingly, the QT-Opt approach described herein is an alternative approach that maintains the generality of non-convex Q-functions while avoiding the need for a second maximizer network. In the QT-Opt approach, a state s and action a are inputs into the policy model, and the max in Equation (3) below is evaluated by means of a stochastic optimization algorithm that can handle non-convex and multimodal optimization landscapes.

$$\in(\theta) = E_{(s,a,s')\sim p(s,a,s')}\left[E_\theta \sim R_t\left[\text{cross\_entropy}\left(Q_\theta(s, a), r(s, a) + \gamma \max_{a'} Q_{\bar{\theta}}(s', a')\right)\right]\right] \quad (3)$$

Formally, let $\pi_\theta(s)$ be the policy implicitly induced by the Q-function $Q_\theta(s, a)$. Equation (3) can be recovered by substituting the optimal policy $\pi_\theta(s)=\arg\max_a Q_\theta(s, a)$ in place of the arg max argument to the target Q-function. In QT-Opt, $\pi_\theta(s)$ is instead evaluated by running a stochastic optimization over a, using $Q_\theta(s, a)$ as the objective value. The cross-entropy method (CEM) is one algorithm for performing this optimization, which is easy to parallelize and moderately robust to local optima for low-dimensional problems. CEM is a simple derivative-free optimization algorithm that samples a batch of N values at each iteration, fits a Gaussian distribution to the best $M<N$ of these samples, and then samples next batch of N from that Gaussian. In some implementations, $N=64$ and $M=6$, and two iterations of CEM are performed. As described herein, this procedure can be used both to compute targets at training time, and to choose actions for exploration in the real world.

Figure 2:
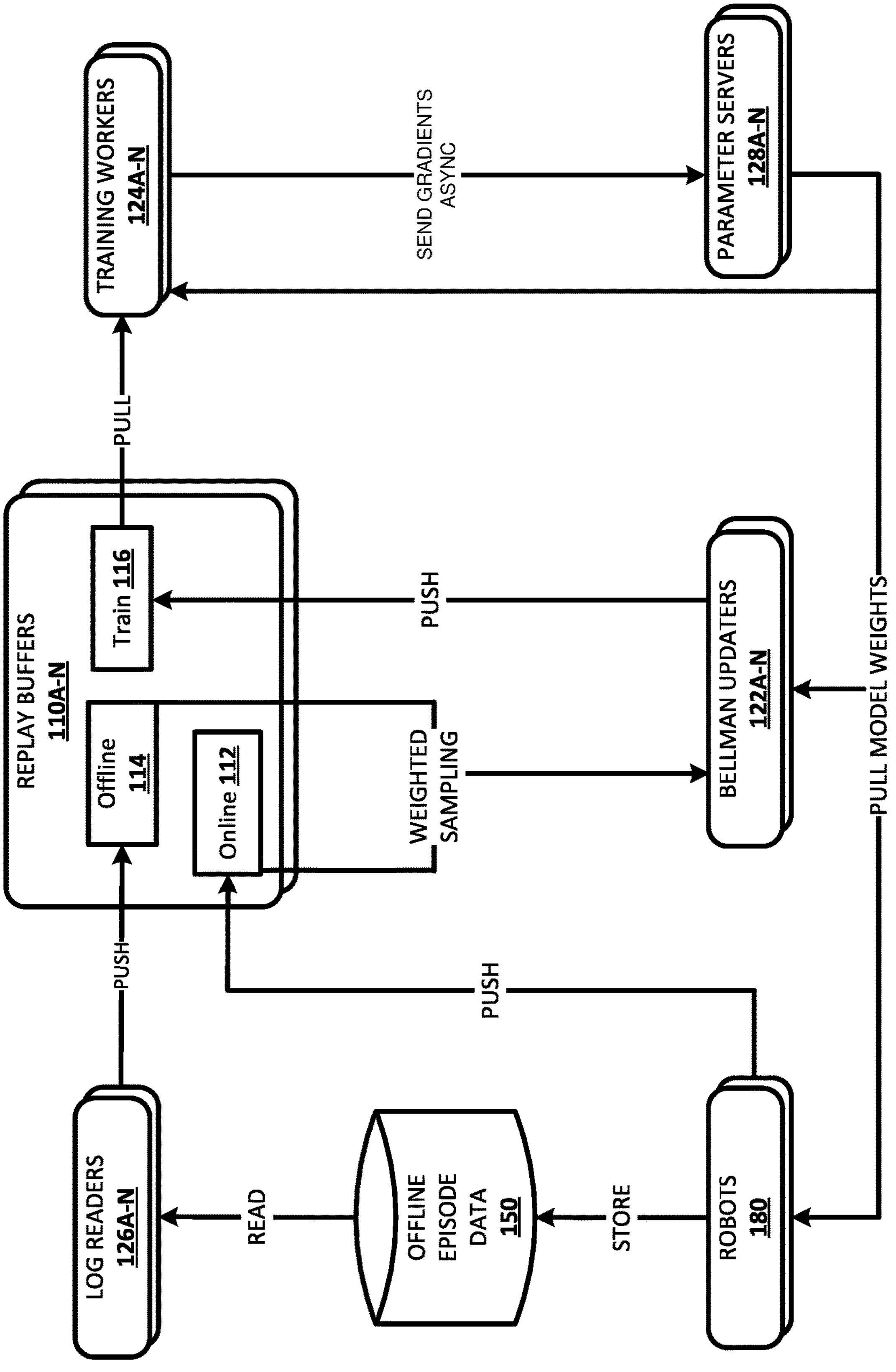
FIG. 2 illustrates components of the example environment of FIG. 1, and various interactions that can occur between the components.

Turning now to FIG. 2, components of the example environment of FIG. 1 are illustrated, and various interactions that can occur between the components. These interactions can occur during reinforcement learning to train the policy model 152 according to implementations disclosed herein. Large-scale reinforcement learning that requires generalization over new scenes and objects requires large amounts of diverse data. Such data can be collected by operating robots 180 over a long duration (e.g., several weeks across 7 robots) and storing episode data in offline episode data database 150.

To effectively ingest and train on such large and diverse datasets, a distributed, asynchronous implementation of QT-Opt can be utilized. FIG. 2 summarizes implementations of the system. A plurality of log readers 126A-N operating in parallel reads historical data from offline episode data 150 to generate transitions that it pushes to offline buffer 114 of replay buffer. In some implementations, log readers 126A-N can each perform one or more steps of method 300 of FIG. 3. In some implementations, 50, 100, or more log readers 126A-N can operate in parallel, which can help decouple correlations between consecutive episodes in the offline episode data database 150, and lead to improved training (e.g., faster convergence and/or better performance of the trained policy model).

Further, online transitions can optionally be pushed, from robots 180, to online buffer 112. The online transitions can also optionally be stored in offline episode data database 150 and later read by log readers 126A-N, at which point they will be offline transitions.

A plurality of bellman updaters 122A-N operating in parallel sample transitions from the offline and online buffers 114 and 112. In various implementations, this is a weighted sampling (e.g., a sampling rate for the offline buffer 114 and a separate sampling rate for the online buffer 112) that can vary with the duration of training. For example, early in training the sampling rate for the offline buffer 114 can be relatively large, and can decrease with duration of training (and, as a result, the sampling rate for the online buffer 112 can increase). This can avoid overfitting to the initially scarce on-policy data, and can accommodate the much lower rate of production of on-policy data.

The Bellman updaters 122A-N label sampled data with corresponding target values, and store the labeled samples in a train buffer 116, which can operate as a ring buffer. In labeling a given instance of sampled data with a given target value, one of the Bellman updaters 122A-N can carry out the CEM optimization procedure using the current policy model (e.g., with current learned parameters). Note that one consequence of this asynchronous procedure is that the samples in train buffer 116 are labeled with different lagged versions of the current model. In some implementations, bellman updaters 122A-N can each perform one or more steps of method 500 of FIG. 5.

A plurality of training workers 124A-N operate in parallel and pull labeled transitions from the train buffer 116 randomly and use them to update the policy model 152. Each of the training workers 124A-N computes gradients and sends the computed gradients asynchronously to the parameter servers 128A-N. In some implementations, bellman updaters 122A-N can each perform one or more steps of method 600 of FIG. 6. The training workers 124A-N, the Bellman updaters 122A-N, and the robots 180 can pull model weights form the parameter servers 128A-N periodically, continuously, or at other regular or non-regular intervals and can each update their own local version of the policy model 152 utilizing the pulled model weights.

Additional description of implementations of methods that can be implemented by various components of FIGS. 1 and 2 is provided below with reference to the flowcharts of FIGS. 3-7.

Figure 3:
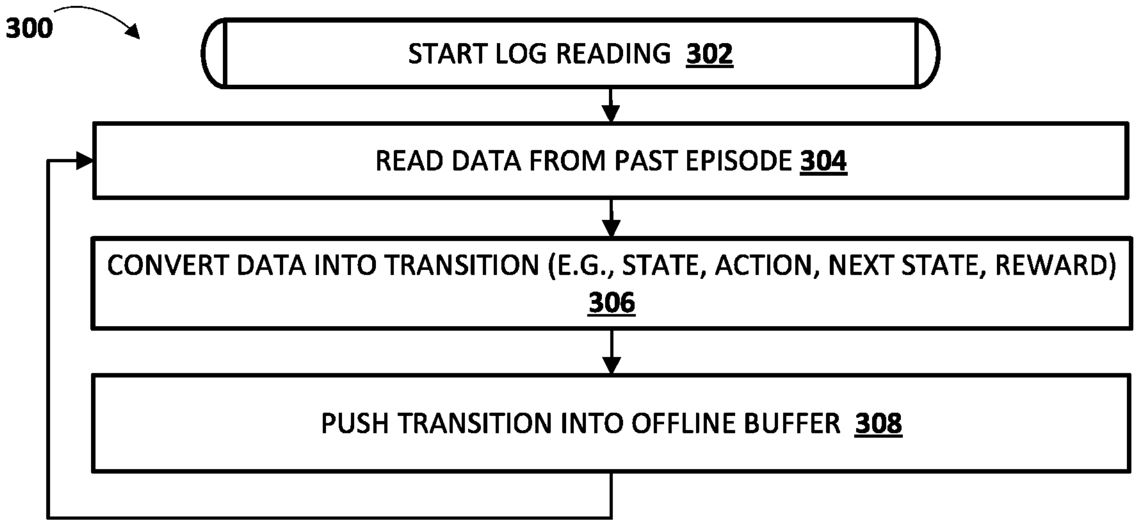
FIG. 3 is a flowchart illustrating an example method of converting stored offline episode data into a transition, and pushing the transition into an offline buffer.

FIG. 3 is a flowchart illustrating an example method 300 of converting stored offline episode data into a transition, and pushing the transition into an offline buffer. For convenience, the operations of the flow chart are described with reference to a system that performs the operations. This system may include one or more components of one or more computer systems, such as one or more processors of one of log readers 126A-N(FIG. 1). Moreover, while operations of method 300 are shown in a particular order, this is not meant to be limiting. One or more operations may be reordered, omitted or added.

At block 302, the system starts log reading. For example, log reading can be initialized at the beginning of reinforcement learning.

At block 304, the systems reads data from a past episode. For example, the system can read data from an offline episode data database that stores states, actions, and rewards from past episodes of robotic performance of a task. The past episode can be one performed by a corresponding real physical robot based on a past version of a policy model. The past episode can, in some implementations and/or situations (e.g., at the beginning of reinforcement learning) be one performed based on a scripted exploration policy, based on a demonstrated (e.g., through virtual reality, kinesthetic teaching, etc.) performance of the task, etc. Such scripted exploration performances and/or demonstrated performances can be beneficial in bootstrapping the reinforcement learning as described herein.

At block 306, the system converts data into a transition. For example, the data read can be from two time steps in the past episode and can include state data (e.g., vision data) from a state, state data from a next state, an action taken to transition from the state to the next state (e.g., gripper translation and rotation, gripper open/close, and whether action led to a termination), and a reward for the action. The reward can be determined as described herein, and can optionally be previously determined and stored with the data.

At block 308, the system pushes the transition into an offline buffer. The system then returns to block 304 to read data from another past episode.

In various implementations, method 300 can be parallelized across a plurality of separate processors and/or threads. For example, method 300 can be performed simultaneously by each of 50, 100, or more separate workers.

Figure 4:
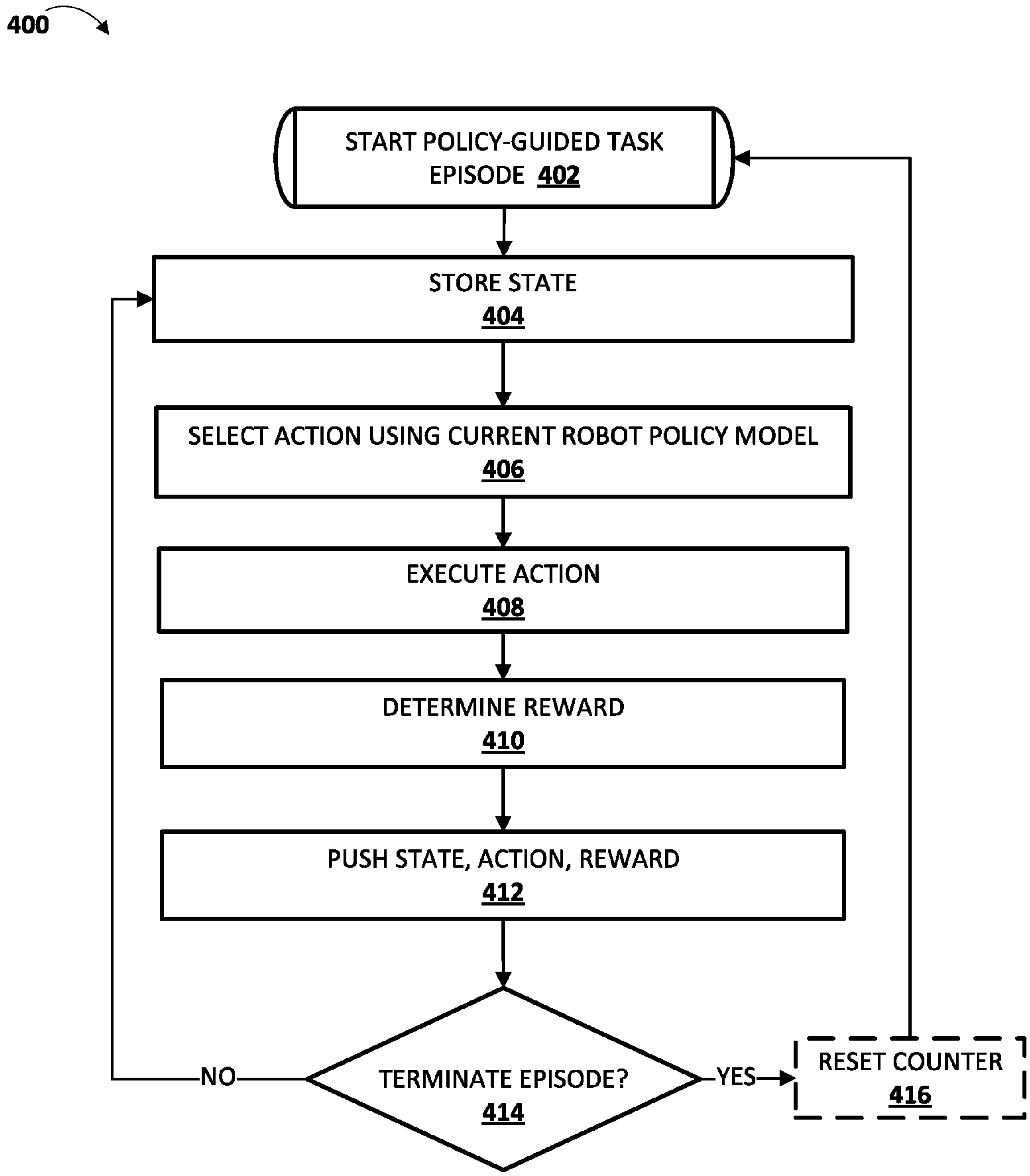
FIG. 4 is a flowchart illustrating an example method of performing a policy-guided task episode, and pushing data from the policy-guided task episode into an online buffer and optionally an offline database.

FIG. 4 is a flowchart illustrating an example method 400 of performing a policy-guided task episode, and pushing data from the policy-guided task episode into an online buffer an optionally an offline database. For convenience, the operations of the flow chart are described with reference to a system that performs the operations. This system may include one or more components of one or more robots, such as one or more processors of one of robots 180A and 180B. Moreover, while operations of method 400 are shown in a particular order, this is not meant to be limiting. One or more operations may be reordered, omitted or added.

At block 402, the system starts a policy-guided task episode.

At block 404, the system stores the state of the robot. For example, the state of the robot can include at least vision data captured by a vision component associated with the robot. For instance, the state can include an image captured by the vision component at a corresponding time step.

At block 406, the system selects an action using a current robot policy model. For example, the system can utilize a stochastic optimization technique (e.g., the CEM technique described herein) to sample a plurality of actions using the current robot policy model, and can select the sampled action with the highest value generated using the current robot policy model.

At block 408, the system executes the action using the current robot policy model. For example, the system can provide commands to one or more actuators of the robot to cause the robot to execute the action. For instance, the system provide commands to actuator(s) of the robot to cause a gripper to translate and/or rotate as dictated by the action and/or to cause the gripper to close or open as dictated by the action (and if different than the current state of the gripper). In some implementations the action can include a termination command (e.g., that indicates whether the episode should terminate) and if the termination command indicates the episode should terminate, the action at block 408 can be a termination of the episode.

At block 410, the system determines a reward based on the system executing the action using the current robot policy model. In some implementations, when the action is a non-terminal action, the reward can be, for example, “0” reward- or a small penalty (e.g., −0.05) to encourage faster robotic task completion. In some implementations, when the action is a terminal action, the reward can be a “0” if the robotic task was successful and a “1” if the robotic task was not successful. For example, for a grasping task the reward can be “1” if an object was successfully grasped, and a “0” otherwise.

The system can utilize various techniques to determine whether a grasp or other robotic task is successful. For example, for a grasp, at termination of an episode the gripper can be moved out of the view of the camera and a first image captured when it is out of the view. Then the gripper can be returned to its prior position and “opened” (if closed at the end of the episode) to thereby drop any grasped object, and a second image captured. The first image and the second image can be compared, using background subtraction and/or other techniques, to determine whether the gripper was grasping an object (e.g., the object would be present in the second image, but not the first)—and an appropriate award assigned to the last time step. In some implementations, the height of the gripper and/or other metric(s) can also optionally be considered. For example, a grasp may only be considered if the height of the gripper is above a certain threshold.

At block 412, the system pushes the state of block 404, the action selected at block 406, and the reward of block 410 to an online buffer to be utilized as online data during reinforcement learning. The next state (from a next iteration of block 404) can also be pushed to the online buffer. At block 412, the system can also push the state of block 404, the action selected at block 406, and the reward of block 410 to an offline buffer to be subsequently used as offline data during the reinforcement learning (e.g. utilized many time steps in the future in the method 300 of FIG. 3).

At block 414, the system determines whether to terminate the episode. In some implementations and/or situations, the system can terminate the episode if the action at a most recent iteration of block 408 indicated termination. In some additional or alternative implementations and/or situations, the system can terminate the episode if a threshold quantity of iterations of blocks 404-412 have been performed for the episode and/or if other heuristics based termination conditions have been satisfied.

If, at block 414, the system determines not to terminate the episode, then the system returns to block 404. If, at block 414, the system determines to terminate the episode, then the system proceeds to block 402 to start a new policy-guided task episode. The system can, a bock 416, optionally reset a counter that is used in block 414 to determine if a threshold quantity of iterations of blocks 404-412 have been performed.

In various implementations, method 400 can be parallelized across a plurality of separate real and/or simulated robots. For example, method 400 can be performed simultaneously by each of 5, 10, or more separate real robots. Also, although method 300 and method 400 are illustrated in separate figures herein for the sake of clarity, it is understood that in many implementations methods 300 and 400 are performed in parallel during reinforcement learning.

Figure 5:
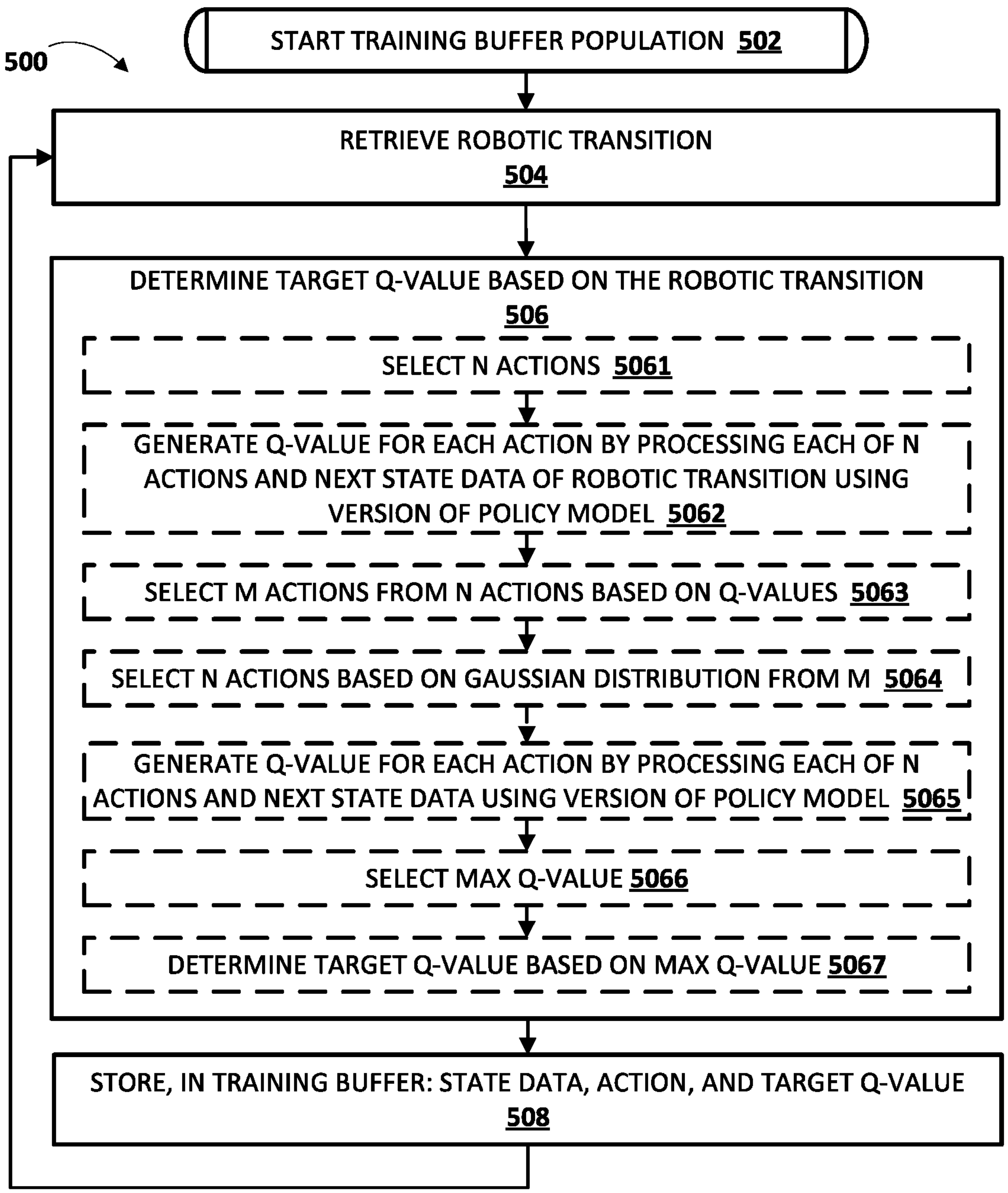
FIG. 5 is a flowchart illustrating an example method of using data from an online buffer or offline buffer in populating a training buffer with data that can be used to train a policy model.

FIG. 5 is a flowchart illustrating an example method 500 of using data from an online buffer or offline buffer in populating a training buffer with data that can be used to train a policy model. For convenience, the operations of the flow chart are described with reference to a system that performs the operations. This system may include one or more components of one or more computer systems, such as one or more processors of one of replay buffers 110A-N. Moreover, while operations of method 500 are shown in a particular order, this is not meant to be limiting. One or more operations may be reordered, omitted or added.

At block 502, the system starts training buffer population.

At block 504, the system retrieves a robotic transition. The robotic transition can be retrieved from an online buffer or an offline buffer. The online buffer can be one populated according to method 400 of FIG. 4. The offline buffer can be one populated according to the method 300 of FIG. 3. In some implementations, the system determines whether to retrieve the robotic transition from the online buffer of the offline buffer based on respective sampling rates for the two buffers. As described herein, the sampling rates for the two buffers can vary as reinforcement learning progresses. For example, as reinforcement learning progresses the sampling rate for the offline buffer can decrease and the sampling rate for the online buffer can increase.

At block 506, the system determines a target Q-value based on the retrieved robotic transition information from block 504. In some implementations, the system determines the target Q-value using stochastic optimization techniques as described herein. In some implementations, the stochastic optimization technique is CEM and, in some of those implementations, block 506 may include one or more of the following sub-blocks.

At sub-block 5061, the system selects N actions for the robot, where N is an integer number.

At sub-block 5062, the system generates a Q-value for each action by processing each of the N actions for the robot and processing next state data of the robotic transition (of block 504) using a version of a policy model.

At sub-block 5063, the system selects M actions from the N actions based on the generated Q-values, where M is an integer number.

At sub-block 5064, the system selects N actions based on a Gaussian distribution from the M actions.

At sub-block 5065, the system generates a Q-value for each action by processing each of the N actions and processing the next state data using the version of the policy model.

At sub-block 5066, the system selects a max Q-value from the generated Q-values at sub-block 5065.

At sub-block 5067, the system determines a target Q-value based on the max Q-value selected at sub-block 5066. In some implementations, the system determines the target Q-value as a function of the max Q-value and a reward included in the robotic transition retrieved at block 504.

At block 508, the system stores, in a training buffer, state data, a corresponding action, and the target Q-value determined at sub-block 5067. The system then proceeds to block 504 to perform another iteration of blocks 504, 506, and 508.

In various implementations, method 500 can be parallelized across a plurality of separate processors and/or threads. For example, method 500 can be performed simultaneously by each of 5, 10, or more separate threads. Also, although method 300, 400, and 500 are illustrated in separate figures herein for the sake of clarity, it is understood that in many implementations methods 300, 400, and 500 are performed in parallel during reinforcement learning.

Figure 6:
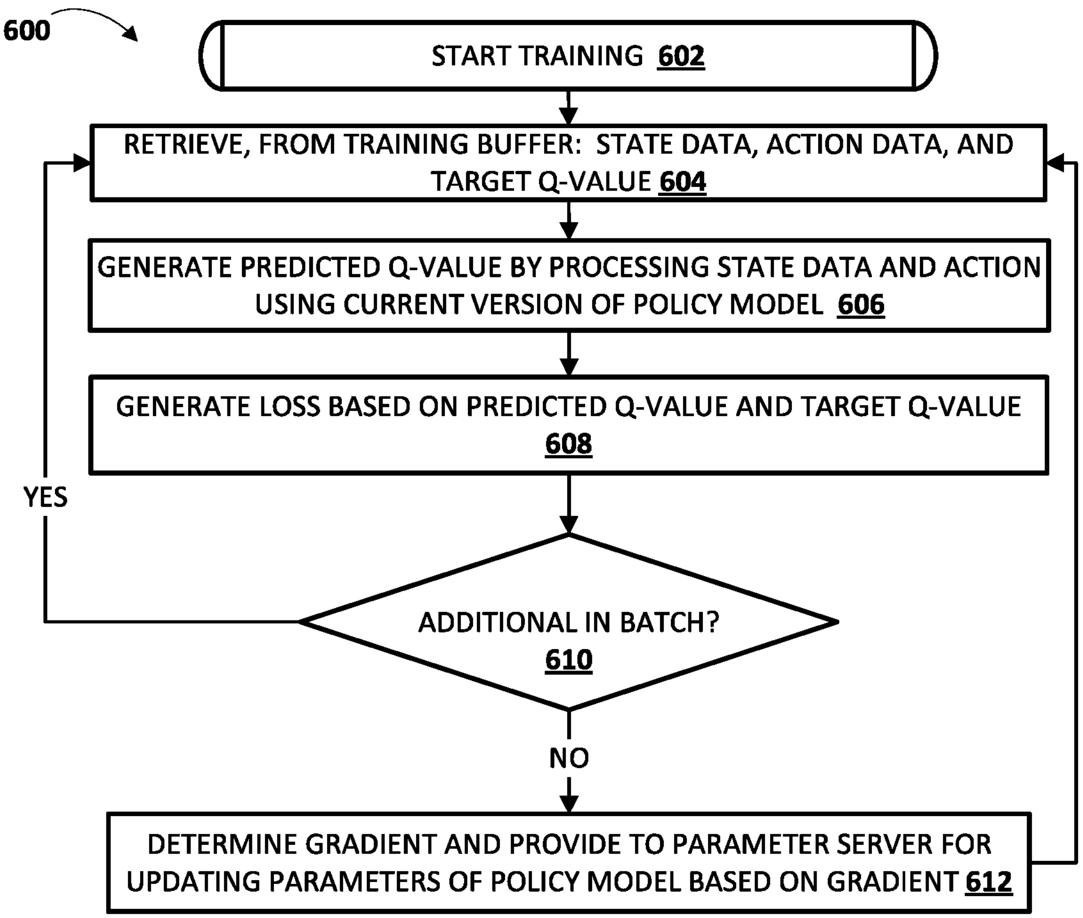
FIG. 6 is a flowchart illustrating an example method of training a policy model.

FIG. 6 is a flowchart illustrating an example method 600 of training a policy model. For convenience, the operations of the flow chart are described with reference to a system that performs the operations. This system may include one or more components of one or more computer systems, such as one or more processors of one of training workers 124A-N and/or parameter servers 128A-N. Moreover, while operations of method 600 are shown in a particular order, this is not meant to be limiting. One or more operations may be reordered, omitted or added.

At block 602, the system starts training the policy model.

At block 604, the system retrieves, from a training buffer, state data of a robot, action data of the robot, and a target Q-value for the robot.

At block 606, the system generates a predicted Q-value by processing the state data of the robot and an action of the robot using a current version of the policy model. It is noted that in various implementations the current version of the policy model utilized to generate the predicted Q-value at block 606 will be updated relative to the model utilized to generate the target Q-value that is retrieved at block 604. In other words, the target Q-value that is retrieved at block 604 will be generated based on a lagged version of the policy model.

At block 608, the system generates a loss value based on the predicted Q-value and the target Q-value. For example, the system can generate a log loss based on the two values.

At block 610, the system determines whether there is an additional state data, action data, and target Q-value to be retrieved for the batch (where batch techniques are utilized). If it is determined that there is additional state data, action data, and target Q-value to be retrieved for the batch, then the system performs another iteration of blocks 604, 606, and 608. If it is determined that there is not an additional batch for training the policy model, then the system proceeds to block 612.

At block 612, the system determines a gradient based on the loss(es) determined at iteration(s) of block 608, and provides the gradient to a parameter server for updating parameters of the policy model based on the gradient. The system then proceeds back to block 604 and performs additional iterations of blocks 604, 606, 608, and 610, and determines an additional gradient at block 612 based on loss(es) determined in the additional iteration(s) of block 608.

In various implementations, method 600 can be parallelized across a plurality of separate processors and/or threads. For example, method 600 can be performed simultaneously by each of 5, 10, or more separate threads. Also, although method 300, 400, 500, and 600 are illustrated in separate figures herein for the sake of clarity, it is understood that in many implementations methods 300, 400, 500, and 600 are performed in parallel during reinforcement learning.

Figure 7:
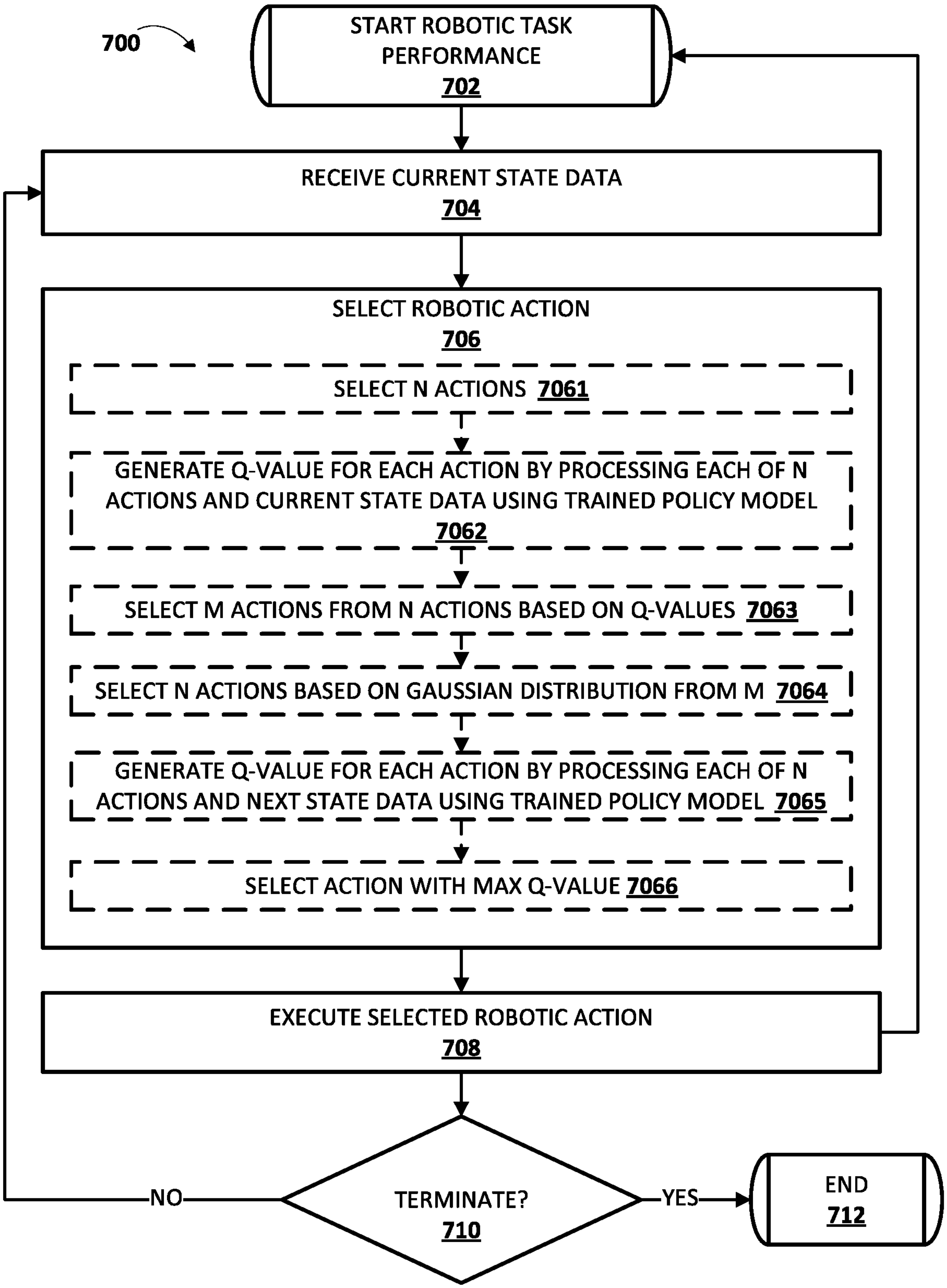
FIG. 7 is a flowchart illustrating an example method of performing a robotic task using a trained policy model.

FIG. 7 is a flowchart illustrating an example method 700 of performing a robotic task using a trained policy model. The trained policy model is considered optimal according to one or more criteria, and can be trained, for example, based on methods 300, 400, 500, and 600 of FIGS. 3-6. For convenience, the operations of the flow chart are described with reference to a system that performs the operations. This system may include one or more components of one or more robots, such as one or more processors of one of robots 180A and 180B. Moreover, while operations of method 700 are shown in a particular order, this is not meant to be limiting. One or more operations may be reordered, omitted or added.

At block 702, the system starts performance of a robotic task.

At block 704, the system receives current state data of a robot to perform the robotic task.

At block 706, the system selects a robotic action to perform the robotic task. In some implementations, the system selects the robotic action using stochastic optimization techniques as described herein. In some implementations, the stochastic optimization technique is CEM and, in some of those implementations, block 706 may include one or more of the following sub-blocks.

At sub-block 7061, the system selects N actions for the robot, where N is an integer number.

At sub-block 7062, the system generates a Q-value for each action by processing each of the N actions for the robot and processing current state data using a trained policy model.

At sub-block 7063, the system selects M actions from the N actions based on the generated Q-values, where M is an integer number.

At sub-block 7064, the system selects N actions based on a Gaussian distribution from the M actions.

At sub-block 7065, the system generates a Q-value for each action by processing each of the N actions and processing the next state data using the trained policy model.

At sub-block 7066, the system selects a max Q-value from the generated Q-values at sub-block 7065.

At block 708, the robot executes the selected robotic action.

At block 710, the system determines whether to terminate performance of the robotic task. In some implementations and/or situations, the system can terminate the performance of the robotic task if the action at a most recent iteration of block 706 indicated termination. In some additional or alternative implementations and/or situations, the system can terminate the episode if a threshold quantity of iterations of blocks 704, 706, and 708 have been performed for the performance and/or if other heuristics based termination conditions have been satisfied.

If the system determines, at block 710, not to terminate the selected robotic action, then the system performs another iteration of blocks 704, 706, and 708. If the system determines, at block 710, to terminate the selected robot action, then the system proceeds to block 712 and ends performance of the robotic task.

FIGS. 8A and 8B illustrate an architecture of an example policy model 800, example state data and action data that can be applied as input to the policy model 800, and an example output 880 that can be generated based on processing the input using the policy model 800. The policy model 800 is one example of policy model 152 of FIG. 1. Further, the policy model 800 is one example of a neural network model that can be trained, using reinforcement learning, to represent a Q-function. Yet further, the policy model 800 is one example of a policy model that can be utilized by a robot in performance of a robotic task (e.g., based on the method 700 of FIG. 7).

In FIG. 8A, the state data includes current vision data 861 and optionally includes a gripper open value 863 that indicates whether a robot gripper is currently open or closed. In some implementations, additional or alternative state data can be included, such as a state value that indicates a current height (e.g., relative to a robot base) of an end effector of the robot.

In FIG. 8A, the action data is represented by reference number 862 and includes: (t) that is a Cartesian vector that indicates a gripper translation; (r) that indicates a gripper rotation; $g_{open}$ and $g_{close}$ that collectively can indicate whether a gripper is to be opened, closed, or adjusted to a target state between opened and closed (e.g., partially closed); and (e) that dictates whether to terminate performance of the robotic task.

The policy model 800 includes a plurality of initial convolutional layers 864, 866, 867, etc. with interspersed max-pooling layers 865, 868, etc. The vision data 861 is processed using the initial convolutional layers 864, 866, 867, etc. and max-pooling layers 865, 868, etc.

The policy model 800 also includes two fully connected layers 869 and 870 that are followed by a reshaping layer 871. The action 862 and optionally the gripper open value 863 are processed using the fully connected layers 869, 870 and the reshaping layer 871. As indicated by the "+" of FIG. 8A, the output from the processing of the vision data 861 is concatenated with the output from the processing of the action 862 (and optionally the gripper open value 863). For example, they can be pointwise added through tiling.

Figure 9:
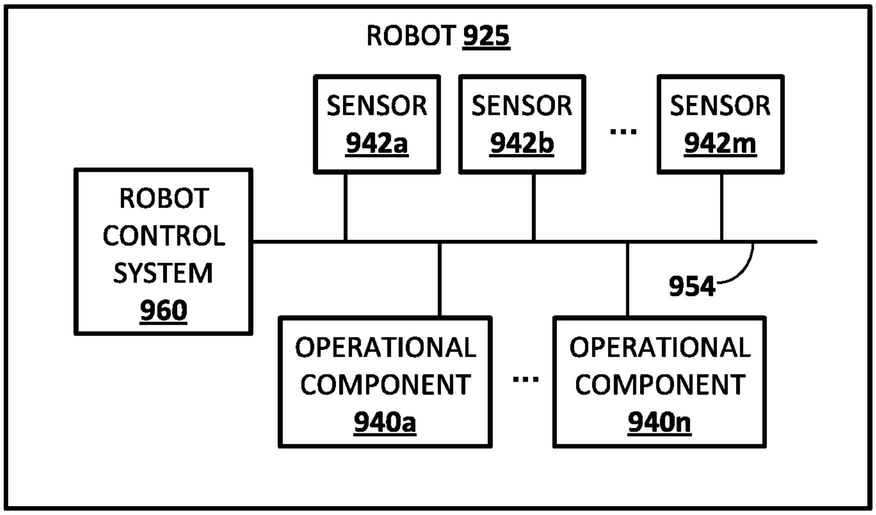
FIG. 9 schematically depicts an example architecture of a robot.

Turning now to FIG. 8B, the concatenated value is then processed using additional convolutional layers 872, 873, 875, 876, etc. with interspersed max-pooling layers 874, etc. The final convolutional layer 876 is fully connected to a first fully connected layer 877 which, in turn, is fully connected to a second fully connected layer 878. The output of the second fully connected layer 878 is processed using a sigmoid function 879 to generate a predicted Q-value 880. During inference, the predicted Q-value can be utilized, in a stochastic optimization procedure, in determining whether to select action 862 as described herein. During inference, the predicted Q-value can be utilized, in a stochastic optimization procedure, in determining whether to select action 862 as described herein. During training, the predicted Q-value can be compared to a target Q-value 881, generated based on a stochastic optimization procedure as described herein, to generate a log loss 882 for updating the policy model 800. FIG. 9 schematically depicts an example architecture of a robot 925. The robot 925 includes a robot control system 960, one or more operational components 940*a*-940*n*, and one or more sensors 942*a*-942*m*. The sensors 942*a*-942*m* may include, for example, vision sensors, light sensors, pressure sensors, pressure wave sensors (e.g., microphones), proximity sensors, accelerometers, gyroscopes, thermometers, barometers, and so forth. While sensors 942*a*-942*m* are depicted as being integral with robot 925, this is not meant to be limiting. In some implementations, sensors 942*a*-942*m* may be located external to robot 925, e.g., as standalone units.

Operational components 940*a*-940*n* may include, for example, one or more end effectors and/or one or more servo motors or other actuators to effectuate movement of one or more components of the robot. For example, the robot 925 may have multiple degrees of freedom and each of the actuators may control actuation of the robot 925 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 960 may be implemented in one or more processors, such as a CPU, GPU, and/or other controller(s) of the robot 925. In some implementations, the robot 925 may comprise a "brain box" that may include all or aspects of the control system 960. For example, the brain box may provide real time bursts of data to the operational components 940*a*-940*n*, with each of the real time bursts comprising a set of one or more control commands that dictate, inter alia, the parameters of motion (if any) for each of one or more of the operational components 940*a*-940*n*. In some implementations, the robot control system 960 may perform one or more aspects of methods 400 and/or 700 described herein.

As described herein, in some implementations all or aspects of the control commands generated by control system 960 in performing a robotic task can be based on an action selected based on a current state (e.g., based at least on current vision data) and based on utilization of a trained policy model as described herein. Stochastic optimization techniques can be utilized in selecting an action at each time step of controlling the robot. Although control system 960 is illustrated in FIG. 9 as an integral part of the robot 925, in some implementations, all or aspects of the control system 960 may be implemented in a component that is separate from, but in communication with, robot 925. For example, all or aspects of control system 960 may be implemented on one or more computing devices that are in wired and/or wireless communication with the robot 925, such as computing device 1010.

Figure 10:
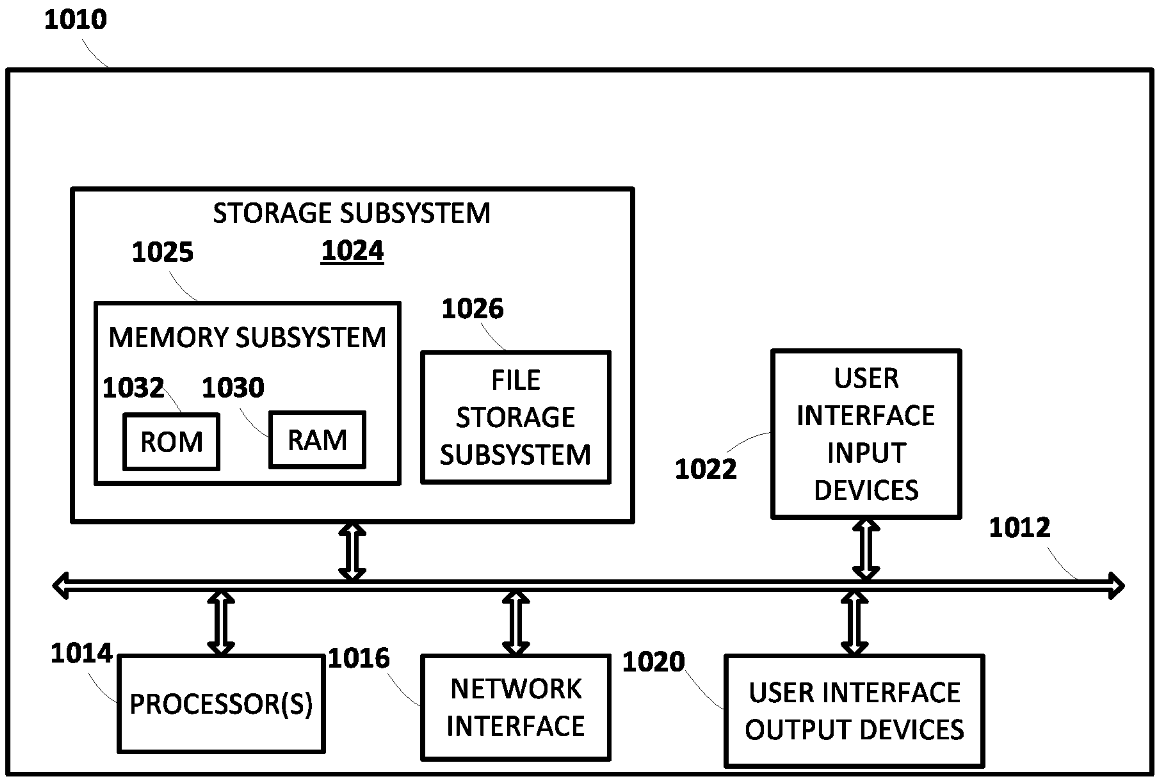
FIG. 10 schematically depicts an example architecture of a computer system.

FIG. 10 is a block diagram of an example computing device 1010 that may optionally be utilized to perform one or more aspects of techniques described herein. For example, in some implementations computing device 1010 may be utilized to provide desired object semantic feature(s) for grasping by robot 925 and/or other robots. Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 924 may include the logic to perform selected aspects of the method of FIGS. 3, 4, 5, 6, and/or 7.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

Particular examples of some implementations disclosed herein are now described, along with various advantages that can be achieved in accordance with those and/or other examples.

In contrast to static learning behaviors that choose a grasp point and then execute the desired grasp, implementations disclosed herein enable closed-loop vision-based control, whereby the robot continuously updates its grasp strategy, based on the most recent observations, to optimize long-horizon grasp success. Those implementations can utilize QT-Opt, a scalable self-supervised vision-based reinforcement learning framework that can leverage thousands (e.g., over 500,000) real-world grasp attempts to train a deep neural network Q-function with a large quantity of parameters (e.g., over 500,000 or over 1,000,000) to perform closed-loop, real-world grasping that generalizes to a high grasp success rate (e.g., >90%, >95%) on unseen objects.

Aside from attaining a very high success rate, grasping utilizing techniques described herein exhibits behaviors that are quite distinct from more standard grasping systems. For example, some techniques can automatically learn regrasping strategies, probe objects to find the most effective grasps, learn to reposition objects and perform other non-prehensile pre-grasp manipulations, and/or respond dynamically to disturbances and perturbations.

Various implementations utilize observations that come from a monocular RGB camera, and actions that include end-effector Cartesian motion and gripper opening and closing commands (and optionally termination commands). The reinforcement learning algorithm receives a binary reward for lifting an object successfully, and optionally no other reward shaping (or only a sparse penalty for iterations). The constrained observation space, constrained action space, and/or sparse reward based on grasp success can enable reinforcement learning techniques disclosed herein to be feasible to deploy at large scale. Unlike many reinforcement learning tasks, a primary challenge in this task is not just to maximize reward, but to generalize effectively to previously unseen objects. This requires a very diverse set of objects during training. To make maximal use of this diverse dataset, the QT-Opt off-policy training method is utilized, which is based on a continuous-action generalization of Q-learning. Unlike other continuous action Q-learning methods, which are often unstable due to actor-critic instability, QT-Opt dispenses with the need to train an explicit actor, instead using stochastic optimization over the critic to select actions and target values. Even fully off-policy training can outperform strong baselines based on prior work, while a moderate amount of on-policy joint fine-tuning with offline data can improve performance on challenging, previously unseen objects.

QT-Opt trained models attain a high success rate across a range of objects not seen during training. Qualitative experiments show that this high success rate is due to the system adopting a variety of strategies that would be infeasible without closed-loop vision-based control. The learned policies exhibit corrective behaviors, regrasping, probing motions to ascertain the best grasp, non-prehensile repositioning of objects, and other features that are feasible only when grasping is formulated as a dynamic, closed-loop process.

Current grasping systems typically approach the grasping task as the problem of predicting a grasp pose, where the system looks at the scene (typically using a depth camera), chooses the best location at which to grasp, and then executes an open-loop planner to reach that location. In contrast, implementations disclosed herein utilize reinforcement learning with deep neural networks, which enables dynamic closed-loop control. This allows trained policies to perform pre-grasp manipulation, respond to dynamic disturbances, and to learn grasping in a generic framework that makes minimal assumptions about the task.

In contrast to framing closed-loop grasping as a servoing problem, implementations disclosed herein use a general-purpose reinforcement learning algorithm to solve the grasping task, which enables long-horizon reasoning. In practice, this enables autonomously acquiring complex grasping strategies. Further, implementations can be entirely self-supervised, using only grasp outcome labels that are obtained automatically to incorporate long-horizon reasoning via reinforcement learning into a generalizable vision-based system trained on self-supervised real-world data. Yet further, implementations can operate on raw monocular RGB observations (e.g., from an over-the-shoulder camera), without requiring depth observations and/or other supplemental observations.

Implementations of the closed-loop vision-based control framework are based on a general formulation of robotic manipulation as a Markov Decision Process (MDP). At each time step, the policy observes the image from the robot's camera and chooses a gripper command. This task formulation is general and could be applied to a wide range of robotic manipulation tasks that are in addition to grasping. The grasping task is defined simply by providing a reward to the learner during data collection: a successful grasp results in a reward of 1, and a failed grasp a reward of 0. A grasp can be considered successful if, for example, the robot holds an object above a certain height at the end of the episode. The framework of MDPs provide a powerful formalism for such decision making problems, but learning in this framework can be challenging. Generalization requires diverse data, but recollecting experience on a wide range of objects after every policy update is impractical, ruling out on-policy algorithms. Instead, implementations present a scalable off-policy reinforcement learning framework based around a continuous generalization of Q-learning. While actor-critic algorithms are a popular approach in the continuous action setting, implementations disclosed herein recognize that a more stable and scalable alternative is to train only a Q-function, and induce a policy implicitly by maximizing this Q-function using stochastic optimization. To handle the large datasets and networks, a distributed collection and training system is utilized that asynchronously updates target values, collects on-policy data, reloads off-policy data from past experiences, and trains the network on both data streams within a distributed optimization framework.

The utilized QT-Opt algorithm is a continuous action version of Q-learning adapted for scalable learning and optimized for stability, to make it feasible to handle large amounts of off-policy image data for complex tasks like grasping. In reinforcement learning, $s \in S$ denotes the state. As described herein, in various implementations the state can include (or be restricted to) image observations, such as RGB image observations from a monographic RGB camera. Further, $a \in A$ denotes the action. As described herein, in various implementations the action can include (or be restricted to) robot arm motion, gripper command, and optionally termination command. At each time step t, the algorithm chooses an action, transitions to a new state, and receives a reward $r(s_t, a_t)$. The goal in reinforcement learning is to recover a policy that selects actions to maximize the total expected reward. One way to acquire such an optimal policy is to first solve for the optimal Q-function, which is sometimes referred to as the state-action value function. The Q-function specifies the expected reward that will be received after taking some action a in some state s, and the optimal Q-function specifies this value for the optimal policy. In practice, a parameterized Q-function $Q_\theta(s, a)$ can be learned, where $\theta$ can denote the weights in a neural network. The optimal Q-function can be learned by minimizing the Bellman error, given by equation (1) above, where $Q_T(s, a, s') = r(s, a) + \gamma V(s')$ is a target value, and D is a divergence metric. The cross-entropy function can be used for D, since total returns are bounded in [0, 1]. The expectation is taken under the distribution over all previously observed transitions, and $V(s')$ is a target value. Two target networks can optionally be utilized to improve stability, by maintaining two lagged versions of the parameter vector $\theta$, $\bar{\theta}_1$, $\bar{\theta}_2$. $\theta_1$ is the exponential moving averaged version of $\theta$ with an averaging constant of 0.9999. $\hat{\theta}_2$ is a lagged version of $\hat{\theta}_1$ (e.g., lagged by about 6000 gradient steps). The target value can then be computed the target value according to $V(s')=\min_{i=1,2} Q_{\bar{\theta}_1}(s', \arg\max_{a'} Q_{\bar{\theta}_1}(s', a'))$. This corresponds to a combination of Polyak averaging and clipped double Q-learning. Once the Q-function is learned, the policy can be recovered according to $\pi(s)=\arg\max_a Q_{\bar{\theta}_1}(s, a)$. Practical implementations of this method collect samples from environment interaction and then perform off-policy training on all samples collected so far. For large-scale learning problems of the sort addressed herein, a parallel asynchronous version of this procedure substantially improves the ability to scale up this process.

Q-learning with deep neural network function approximators provides a simple and practical scheme for RL with image observations, and is amenable to straightforward parallelization. However, incorporating continuous actions, such as continuous gripper motion in a grasping application, poses a challenge for this approach. Prior work has sought to address this by using a second network that amortizes the maximization, or constraining the Q-function to be convex in a, making it easy to maximize analytically. However, the former class of methods are notoriously unstable, which makes it problematic for large-scale RL tasks where running hyperparameter sweeps is prohibitively expensive. Action-convex value functions are a poor fit for complex manipulation tasks such as grasping, where the Q-function is far from convex in the input. For example, the Q-value may be high for actions that reach toward objects, but low for the gaps between objects.

The proposed QT-Opt presents a simple and practical alternative that maintains the generality of non-convex Q-functions while avoiding the need for a second maximizer network. The image s and action a are inputs into the network, and the arg max in Equation (1) is evaluated with a stochastic optimization algorithm that can handle non-convex and multimodal optimization landscapes. Let $\pi_{\bar{\theta}_1}(s)$ be the policy implicitly induced by the Q-function Qo (s, a). Equation (1) can be recovered by substituting the optimal policy $\pi(s)=\arg\max_a Q_{\bar{\theta}_1}(s, a)$ in place of the arg max argument to the target Q-function. In QT-Opt, $\pi_{\bar{\theta}_1}(s)$ is instead evaluated by running a stochastic optimization over a, using $Q_{\bar{\theta}_1}(s, a)$ as the objective value. For example, the CEM method can be utilized.

Learning vision based policies with reinforcement learning that generalizes over new scenes and objects requires large amounts of diverse data. To effectively train on such large and diverse dataset, a distributed, asynchronous implementation of QT-Opt is utilized. Transitions are stored in a distributed replay buffer database, which both loads historical data from disk and can accept online data from live ongoing experiments across multiple robots. The data in this buffer is continually labeled with target Q-values by using a large set (e.g., >500, 1000) "Bellman updater" jobs, which carry out the CEM optimization procedure using the current target network, and then store the labeled samples in a second training buffer, which operates as a ring buffer. One consequence of this asynchronous procedure is that some samples in the training buffer are labeled with lagged versions of the Q-network. Training workers pull labeled transitions from the training buffer randomly and use them to update the Q-function. Multiple (e.g., >5, 10) training workers can be utilized, each of which compute gradients which are sent asynchronously to parameter servers.

QT-Opt can be applied to enable dynamic vision-based grasping. The task requires a policy that can locate an object, position it for grasping (potentially by performing pre-grasp manipulations), pick up the object, potentially regrasping as needed, raise the object, and then signal that the grasp is complete to terminate the episode. To enable self-supervised grasp labeling in the real world, the reward only indicates whether or not an object was successfully picked up. This represents a fully end-to-end approach to grasping: no prior knowledge about objects, physics, or motion planning is provided to the model aside from the knowledge that it can extract autonomously from the data.

In order to enable the model to learn generalizable strategies that can pick up new objects, perform pre-grasp manipulation, and handle dynamic disturbances with vision-based feedback, it must be trained on a sufficiently large and diverse set of objects. Collecting such data in a single on-policy training run would be impractical. The off-policy QT-Opt algorithm described herein makes it possible to pool experience from multiple robots and multiple experiments. Since a completely random initial policy would produce a very low success with such an unconstrained action space, a weak scripted exploration policy can optionally be utilized to bootstrap data collection. This policy is randomized, but biased toward reasonable grasps, and achieves a grasp success rate around 15-30%. A switch to using the learned QT-Opt policy can then be made once it reaches a threshold success rate (e.g., of about 50%) and/or after a threshold quantity of iterations.

This distributed design of the QT-Opt algorithm can achieve various benefits. For example, trying to store all transitions in the memory of a single machine is infeasible. The employed distributed replay buffer enables storing hundreds of thousands of transitions across several machines. Also, for example, the Q-network is quite large, and distributing training across multiple GPUs drastically increases research velocity by reducing time to convergence. Similarly, in order to support large scale simulated experiments, the design has to support running hundreds of simulated robots that cannot fit on a single machine. As another example, decoupling training jobs from data generation jobs allows treating of training as data-agnostic, making it easy to switch between simulated data, off-policy real data, and on-policy real data. It also lets the speed of training and data generation to be scaled independently.

Online agents (real or simulated robots) collect data from the environment. The policy used can be the Polyak averaged weights $Q_{\bar{\theta}_1}(s, a)$ and the weights are updated every 10 minutes (or at other periodic or non-periodic frequency). That data is pushed to a distributed replay buffer(the "online buffer") and is also optionally persisted to disk for future offline training.

To support offline training, a log replay job can be executed. This job reads data sequentially from disk for efficiency reasons. It replays saved episodes as if an online agent had collected that data. This enables seamless merging off-policy data with on-policy data collected by online agents. Offline data comes from all previously run experiments. In fully off-policy training, the policy can be trained by loading all data with the log replay job, enabling training without having to interact with the real environment.

Despite the scale of the distributed replay buffer, the entire dataset may still not fit into memory. In order to be able to visit each datapoint uniformly, the Log Replay can be continuously run to refresh the in-memory data residing in the Replay Buffer.

Off-policy training can optionally be utilized initially to initialize a good policy, and then a switch made to on-policy joint fine-tuning. To do so, fully off-policy training can be performed by using the Log Replay job to replay episodes from prior experiments. After training off-policy for enough time, QT-Opt can be restarted, training with a mix of on-policy and off-policy data.

Real on-policy data is generated by real robots, where the weights of the policy $Q\pi_{\bar{\theta}_1}$ (s, a) are updated periodically (e.g., every 10 minutes or other frequency). Compared to the offline dataset, the rate of on-policy data production is much lower and the data has less visual diversity. However, the on-policy data also contains real-world interactions that illustrate the faults in the current policy. To avoid overfitting to the initially scarce on-policy data, the fraction of on-policy data can be gradually ramped up (e.g., from 1% to 50%) over gradient update steps (e.g., the first million) of joint fine-tuning training.

Since the real robots can stop unexpectedly (e.g., due to hardware faults), data collection can be sporadic, potentially with delays of hours or more if a fault occurs without any operator present. This can unexpectedly cause a significant reduction in the rate of data collection. To mitigate this, on-policy training can also gated by a training balancer, which enforces a fixed ratio between the number of joint fine-tuning gradient update steps and number of on-policy transitions collected. The ratio can be defined relative to the speed of the GPUs and of the robots, which can change over time.

In various implementations, a target network can be utilized to stabilize deep Q-Learning. Since target network parameters typically lag behind the online network when computing TD error, the Bellman backup can actually be performed asynchronously in a separate process. $r(s, a)+\gamma V(s')$ can be computed in parallel on separate CPU machines, storing the output of those computations in an additional buffer (the "train buffer").

Note that because several Bellman updater replicas are utilized, each replica will load a new target network at different times. All replicas push the Bellman backup to the shared replay buffer in the "train buffer". This makes the target Q-values effectively generated by an ensemble of recent target networks, sampled from an implicit distribution The distributed replay buffer supports having named replay buffers, such as: "online buffer" that holds online data, "offline buffer" that holds offline data, and "train buffer" that stores Q-targets computed by the Bellman updater. The replay buffer interface supports weighted sampling from the named buffers, which is useful when doing on-policy joint fine-tuning. The distributed replay buffer is spread over multiple workers, which each contain a large quantity (e.g., thousands) of transitions. All buffers are FIFO buffers where old values are removed to make space for new ones if the buffer is full.

What is claimed is:

1. A method of training a neural network model that represents a Q-function, the method implemented by a plurality of processors, and the method comprising:

retrieving a robotic transition from an offline buffer, the robotic transition generated based on data from an episode of a robot performing a robotic task, wherein retrieving the robotic transition from the offline buffer is based on a dynamic offline sampling rate for sampling from the offline buffer, wherein the dynamic offline sampling rate decreases as a duration of training the neural network model increases, and the robotic transition including:

state data that comprises vision data captured by a vision component at a state of the robot during the episode, next state data that comprises next vision data captured by the vision component at a next state of the robot during the episode, the next state being transitioned to from the state, an action executed to transition from the state to the next state, and a reward for the robotic transition;

determining a target Q-value for the robotic transition, wherein determining the target Q-value comprises:

performing an optimization over candidate robotic actions using, as an objective function, a version of a neural network model that represents the Q-function, wherein performing the optimization comprises generating Q-values for a subset of the candidate robotic actions that are considered in the optimization, wherein generating each of the Q-values is based on processing of the next state data and a corresponding one of the candidate robotic actions of the subset using the version of the neural network model, selecting, from the generated Q-values, a maximum Q-value, and determining the target Q-value based on the maximum Q-value and the reward;

storing, in a training buffer: the state data, the action, and the target Q-value;

retrieving, from the training buffer: the state data, the action, and the target Q-value;

generating a predicted Q-value, wherein generating the predicted Q-value comprises processing the retrieved state data and the retrieved action using a current version of the neural network model, wherein the current version of the neural network model is updated relative to the version;

generating a loss based on comparing the predicted Q-value generated based on processing the retrieved state data using the current version of the neural network model and the target Q-value determined based on processing the next state data using the version of the neural network model; and updating the current version of the neural network model based on the loss.

2. The method of claim 1, further comprising generating the robotic transition by accessing an offline database that stores offline episodes.

3. The method of claim 1, wherein the action comprises a pose change for a component of the robot, wherein the pose change defines a difference between a pose of the component at the state and a next pose of the component at the next state.

4. The method of claim 3, wherein the component is an end effector and the pose change defines a translation difference for the end effector and a rotation difference for the end effector.

5. The method of claim 4, wherein the end effector is a gripper and the robotic task is a grasping task.

6. The method of claim 3, wherein the action further comprises a termination command when the next state is a terminal state of the episode.

7. The method of claim 3, wherein the action further comprises a component action command that defines a dynamic state, of the component, in the next state of the episode the dynamic state being in addition to translation and rotation of the component.

8. The method of claim 7, wherein the component is a gripper and wherein the dynamic state dictated by the component action command indicates that the gripper is to be closed.

9. The method of claim 1, wherein the state data further comprises a current status of a component of the robot.

10. The method of claim 9, wherein the component of the robot is a gripper and the current status indicates whether the gripper is opened or closed.

11. The method of claim 1, wherein the optimization is a stochastic optimization or is a cross-entropy method (CEM).

12. The method of claim 1, wherein performing the optimization over the candidate robotic actions comprises:

selecting an initial batch of the candidate robotic actions;

generating a corresponding one of the Q-values for each of the candidate robotic actions in the initial batch;

selecting an initial subset of the candidate robotic actions in the initial batch based on the Q-values for the candidate robotic actions in the initial batch;

fitting a Gaussian distribution to the selected initial subset of the candidate robotic actions;

selecting a next batch of the candidate robotic actions based on the Gaussian distribution; and generating a corresponding one of the Q-values for each of the candidate robotic actions in the next batch.

13. The method of claim 12, wherein the maximum Q-value is one of the Q-values of the candidate robotic actions in the next batch and wherein selecting the maximum Q-value is based on the maximum Q-value being the maximum Q-value of the corresponding Q-values of the next batch.

14. A method of training a neural network model that represents a policy, the method implemented by a plurality of processors, and the method comprising:

retrieving a robotic transition from an offline buffer, the robotic transition generated based on data from an episode of a robot performing a robotic task, wherein retrieving the robotic transition from the offline buffer is based on a dynamic offline sampling rate for sampling from the offline buffer, wherein the dynamic offline sampling rate decreases as a duration of training the neural network model increases, and the robotic transition including state data and action data;

determining a target value for the robotic transition, wherein determining the target value comprises:

performing an optimization over candidate robotic actions using, as an objective function, a version of a neural network model that represents the policy;

storing, in a training buffer: the state data, the action data, and the target value;

retrieving, from the training buffer: the state data, the action data, and the target value;

generating a predicted value, wherein generating the predicted value comprises processing the retrieved state data and the retrieved action data using a current version of the neural network model, wherein the current version of the neural network model is updated relative to the version;

generating a loss based on comparing the predicted value generated based on processing the retrieved state data using the current version of the neural network model and the target value determined using the version of the neural network model; and updating the current version of the neural network model based on the loss.

* * * * *